US012607970B2

(12) United States Patent
Seidlitz et al.

(10) Patent No.: US 12,607,970 B2
(45) Date of Patent: Apr. 21, 2026

(54) USING SOFTWARE ENCODED PROCESSING TO ACHIEVE A SIL RATING FOR SAFETY APPLICATIONS EXECUTED IN THE CLOUD OR IN NON-SAFETY RATED SERVERS

(71) Applicant: Rockwell Automation Technologies, Inc., Mayfield Heights, OH (US)

(72) Inventors: Steven Terry Seidlitz, Milwaukee, WI (US); James Grosskreuz, Milwaukee, WI (US); Xiaobo Peng, Shanghai (CN)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 1006 days.

(21) Appl. No.: 17/691,367

(22) Filed: Mar. 10, 2022

(65) Prior Publication Data

US 2023/0288881 A1     Sep. 14, 2023

(51) Int. Cl.
  *G05B 9/02*      (2006.01)
  *G05B 19/042*    (2006.01)
(52) U.S. Cl.
  CPC ........... *G05B 9/02* (2013.01); *G05B 19/0421* (2013.01); *G05B 19/0425* (2013.01)
(58) Field of Classification Search
  None
  See application file for complete search history.

(56) References Cited

U.S. PATENT DOCUMENTS

2015/0067278 A1* 3/2015 Gurumurthi ........ G06F 12/0811
                                                 711/154
2018/0083982 A1* 3/2018 Asenjo ................ H04L 63/0428
                        (Continued)

FOREIGN PATENT DOCUMENTS

EP        3 920 060 A1    12/2021

OTHER PUBLICATIONS

Süßkraut, Martin, AndréSchmitt, and Jörg Kaienburg. "Safe program execution with diversified encoding." Proceedings of the 13th embedded world conference. vol. 20000. No. 40000. 2015. <https://silistra-systems.com/documents/pubs/2015-04_EmbeddedWorld_Session_05II_EN.pdf> (Year: 2015).*

(Continued)

*Primary Examiner* — Kamini S Shah
*Assistant Examiner* — Istiaque Ahmed
(74) *Attorney, Agent, or Firm* — Amin, Turocy & Watson, LLP

(57) ABSTRACT

A cloud-based industrial safety system executes safety applications and interfaces with industrial assets on the plant floor using software encoded processing (SEP). The use of SEP ensures safety reliable execution of safety applications and data communication software by redundantly executing native code, thereby implementing a level of software-based fault detection that is independent of the hardware on which the safety application operates. This allows the cloud-based industrial safety applications to achieve at least SIL3 safety ratings for safety services even though the safety applications are executed using standard COTS hardware that is commonplace in the server market. The use of SEP to reliably execute safety software on the cloud can make possible a wide variety of safety applications that would be difficult to implement using purely localized industrial safety systems.

20 Claims, 17 Drawing Sheets

(56)　　　　　References Cited

U.S. PATENT DOCUMENTS

| | | | | |
|---|---|---|---|---|
| 2018/0143604 | A1* | 5/2018 | Gehrke | G05B 9/02 |
| 2019/0340909 | A1* | 11/2019 | Nguyen | B25J 9/1676 |
| 2020/0033832 | A1 | 1/2020 | Meyer-Graefe | |
| 2020/0344216 | A1* | 10/2020 | Yoshiura | G06F 13/4022 |
| 2023/0259095 | A1* | 8/2023 | Quendt | G05B 19/058 |
| | | | | 700/28 |

OTHER PUBLICATIONS

Microsemi, Developing Safety Critical Applications that Meet IEC 61508 Standards, retrieved from <https://ww1.microchip.com/downloads/aemDocuments/documents/FPGA/ProductDocuments/SupportingCollateral/Developing+Safety+Critical+Applications+that+Meet+IEC+61508+Standards+White+Paper.pdf> (Year: 2013).*

Kuang-Hua Huang and Kuang-Hua Huang,, "Algorithm-Based Fault Tolerance for Matrix Operations", IEEE Transactions on Computers, vol. c-33, No. 6, Jun. 1984 (Year: 1984).*

Extended European search report received for European Application No. 23158771.8 dated Sep. 28, 2023, 13 pages.

Kropp, Alexander et al., "Reliable Control for Robotics—Hardware Resilience Powered by Software," 2021 IEEE 18th Annual Consumer Communications & Networking Conference (CCNC), Mar. 2021, 2 pages.

SILISTRA Systems GmbH, "SIListra Systems goes Robotics," Screen captures from YouTube video clip entitled "SIListra Systems goes Robotics," 15 pages, uploaded on Jul. 20, 2020 by user "SIListra Systems GmbH" at https://www.youtube.com/watch?v=o_kFyJdkX4Q.

Ulbrich, Peter et al., "Eliminating single points of failure in software-based redundancy," 2012 Ninth European Dependable Computing Conference, Sibiu, Romania, 2012, pp. 49-60.

Communication pursuant to Article 94(3) EPC received for EP Patent Application Serial No. 23158771.8 dated Sep. 24, 2025, 08 pages.

* cited by examiner

FENCELESS PERIMETER GUARDING

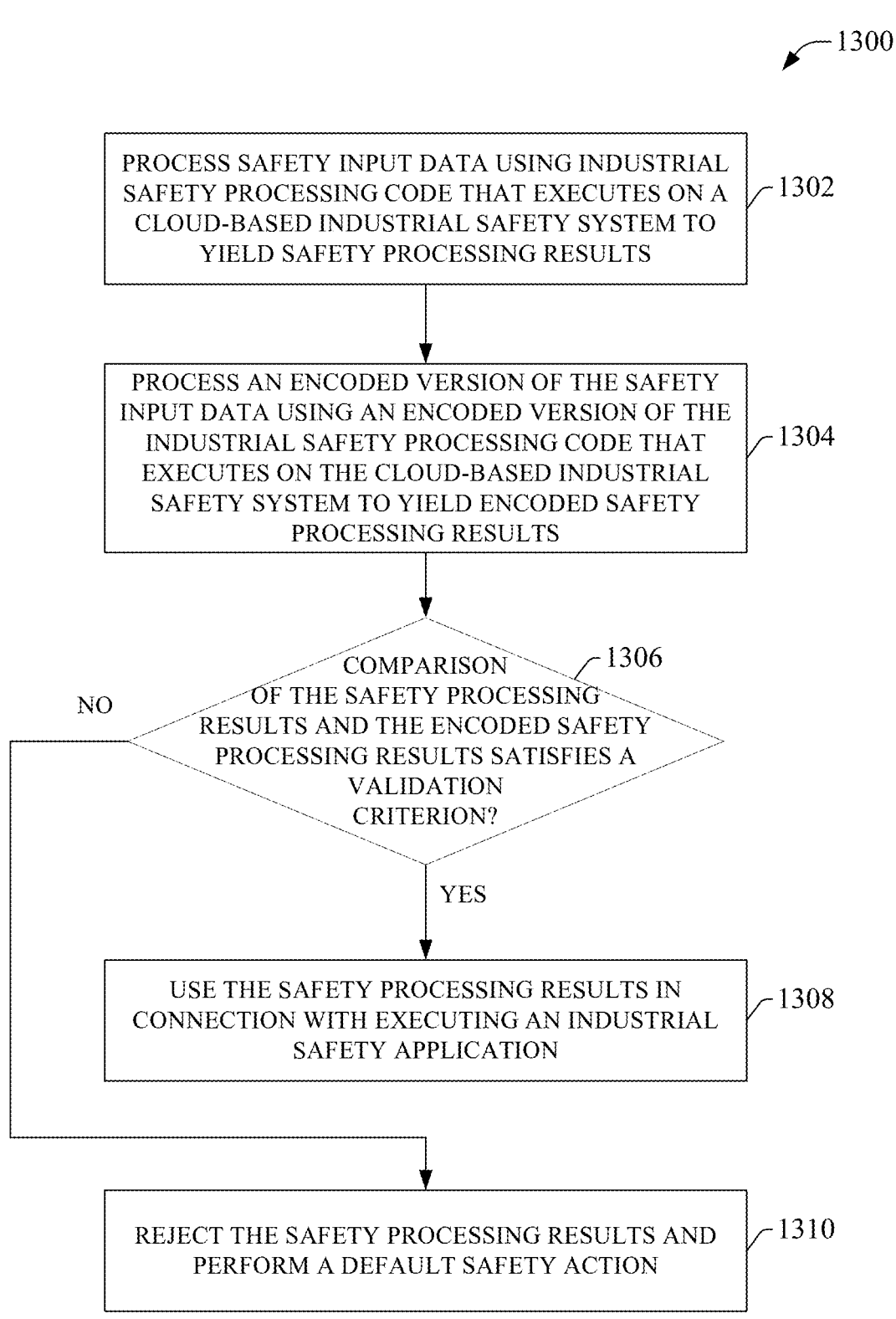

1300

PROCESS SAFETY INPUT DATA USING INDUSTRIAL SAFETY PROCESSING CODE THAT EXECUTES ON A CLOUD-BASED INDUSTRIAL SAFETY SYSTEM TO YIELD SAFETY PROCESSING RESULTS — 1302

PROCESS AN ENCODED VERSION OF THE SAFETY INPUT DATA USING AN ENCODED VERSION OF THE INDUSTRIAL SAFETY PROCESSING CODE THAT EXECUTES ON THE CLOUD-BASED INDUSTRIAL SAFETY SYSTEM TO YIELD ENCODED SAFETY PROCESSING RESULTS — 1304

COMPARISON OF THE SAFETY PROCESSING RESULTS AND THE ENCODED SAFETY PROCESSING RESULTS SATISFIES A VALIDATION CRITERION? — 1306

NO

YES

USE THE SAFETY PROCESSING RESULTS IN CONNECTION WITH EXECUTING AN INDUSTRIAL SAFETY APPLICATION — 1308

REJECT THE SAFETY PROCESSING RESULTS AND PERFORM A DEFAULT SAFETY ACTION — 1310

FIG. 13

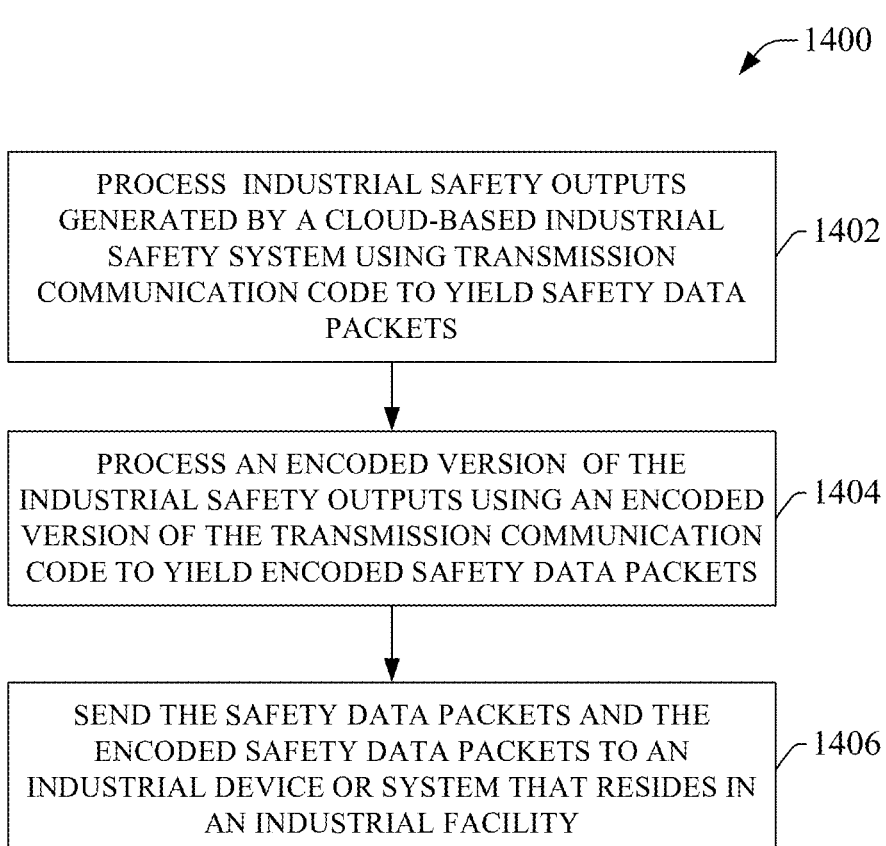

1400

PROCESS INDUSTRIAL SAFETY OUTPUTS GENERATED BY A CLOUD-BASED INDUSTRIAL SAFETY SYSTEM USING TRANSMISSION COMMUNICATION CODE TO YIELD SAFETY DATA PACKETS — 1402

PROCESS AN ENCODED VERSION OF THE INDUSTRIAL SAFETY OUTPUTS USING AN ENCODED VERSION OF THE TRANSMISSION COMMUNICATION CODE TO YIELD ENCODED SAFETY DATA PACKETS — 1404

SEND THE SAFETY DATA PACKETS AND THE ENCODED SAFETY DATA PACKETS TO AN INDUSTRIAL DEVICE OR SYSTEM THAT RESIDES IN AN INDUSTRIAL FACILITY — 1406

FIG. 14

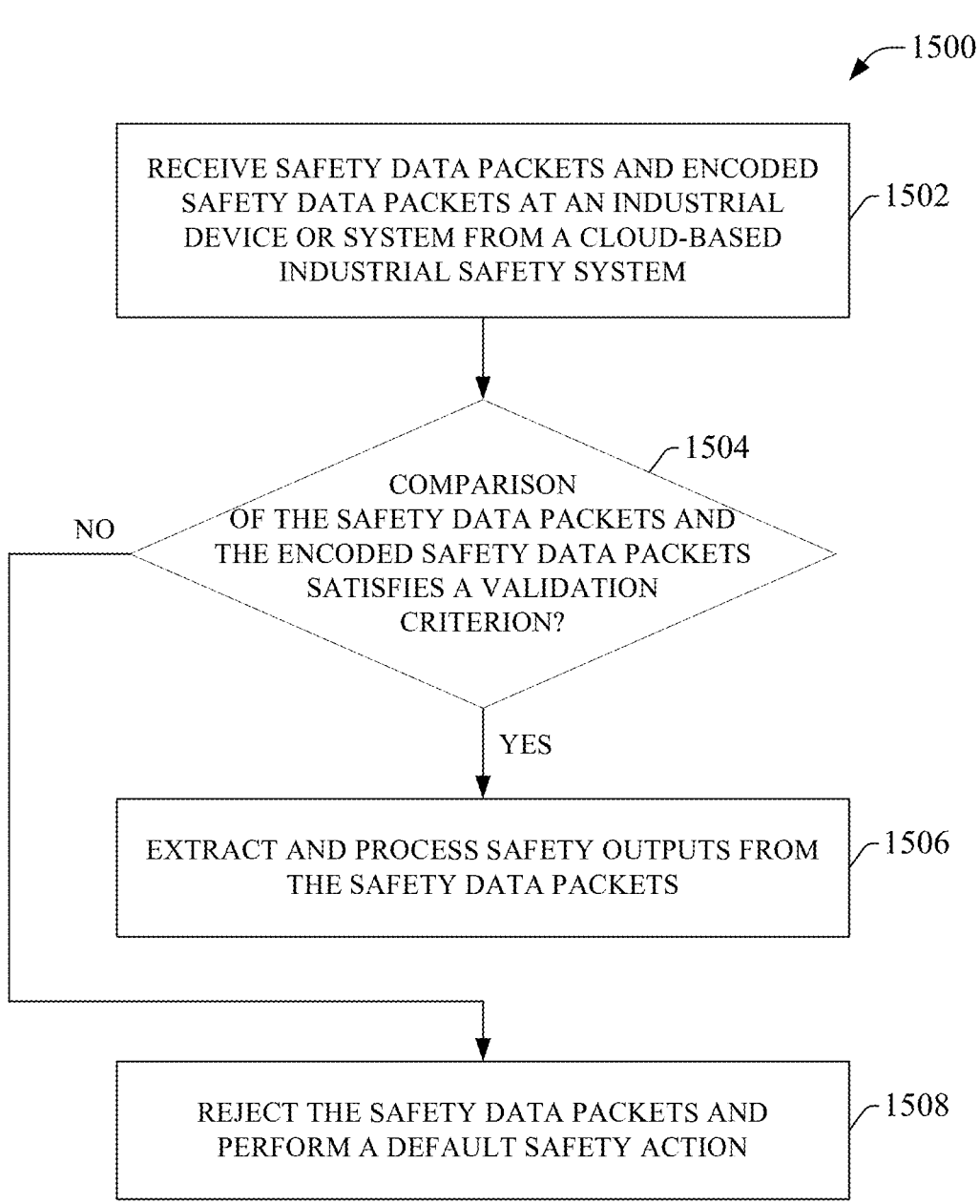

RECEIVE SAFETY DATA PACKETS AND ENCODED SAFETY DATA PACKETS AT AN INDUSTRIAL DEVICE OR SYSTEM FROM A CLOUD-BASED INDUSTRIAL SAFETY SYSTEM — 1502

COMPARISON OF THE SAFETY DATA PACKETS AND THE ENCODED SAFETY DATA PACKETS SATISFIES A VALIDATION CRITERION? — 1504

NO

YES

EXTRACT AND PROCESS SAFETY OUTPUTS FROM THE SAFETY DATA PACKETS — 1506

REJECT THE SAFETY DATA PACKETS AND PERFORM A DEFAULT SAFETY ACTION — 1508

USING SOFTWARE ENCODED PROCESSING TO ACHIEVE A SIL RATING FOR SAFETY APPLICATIONS EXECUTED IN THE CLOUD OR IN NON-SAFETY RATED SERVERS

BACKGROUND

The subject matter disclosed herein relates generally to industrial automation systems, and, more specifically, to industrial functional safety systems.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a system is provided, comprising a communication component configured to collect, on a cloud platform, input data from first industrial devices that operate within an industrial facility; and a safety execution component configured to generate safety control output data directed to one or more second industrial devices within the industrial facility based on processing of the input data on the cloud platform in accordance with an industrial safety application, wherein the safety execution component is configured to execute safety processing code associated with the industrial safety application using software encoded processing.

Also, one or more embodiments provide a method, comprising collecting, by an industrial safety system on a cloud platform comprising a processor, input data from first industrial devices that operate within a plant facility; processing, by the industrial safety system, the input data on the cloud platform in accordance with an industrial safety application, wherein the processing comprises executing safety processing code associated with the industrial safety application using software encoded processing; and sending, by the industrial safety system based on results of the processing, safety control output data directed to one or more second industrial devices within the plant facility.

Also, according to one or more embodiments, a non-transitory computer-readable medium is provided having stored thereon instructions that, in response to execution, cause an industrial safety system to perform operations, the operations comprising receiving, on a cloud platform, input data from first industrial devices that operate within an industrial facility; processing the input data on the cloud platform in accordance with an industrial safety application, wherein the processing comprises executing safety processing code associated with the industrial safety application using software encoded processing; and sending, based on results of the processing, safety control output data directed to one or more second industrial devices within the industrial facility.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 13 is a flowchart of an example methodology for validating error-free industrial safety processing on a cloud-based industrial safety system using software encoded processing.

FIG. 14 is a flowchart of an example methodology for using SEP to encode safety outputs generated by a cloud-based industrial safety system.

FIG. 15 is a flowchart of an example methodology for using SEP to validate safety outputs received at an industrial device or system from a cloud-based industrial safety system.

DETAILED DESCRIPTION

Figure 1:
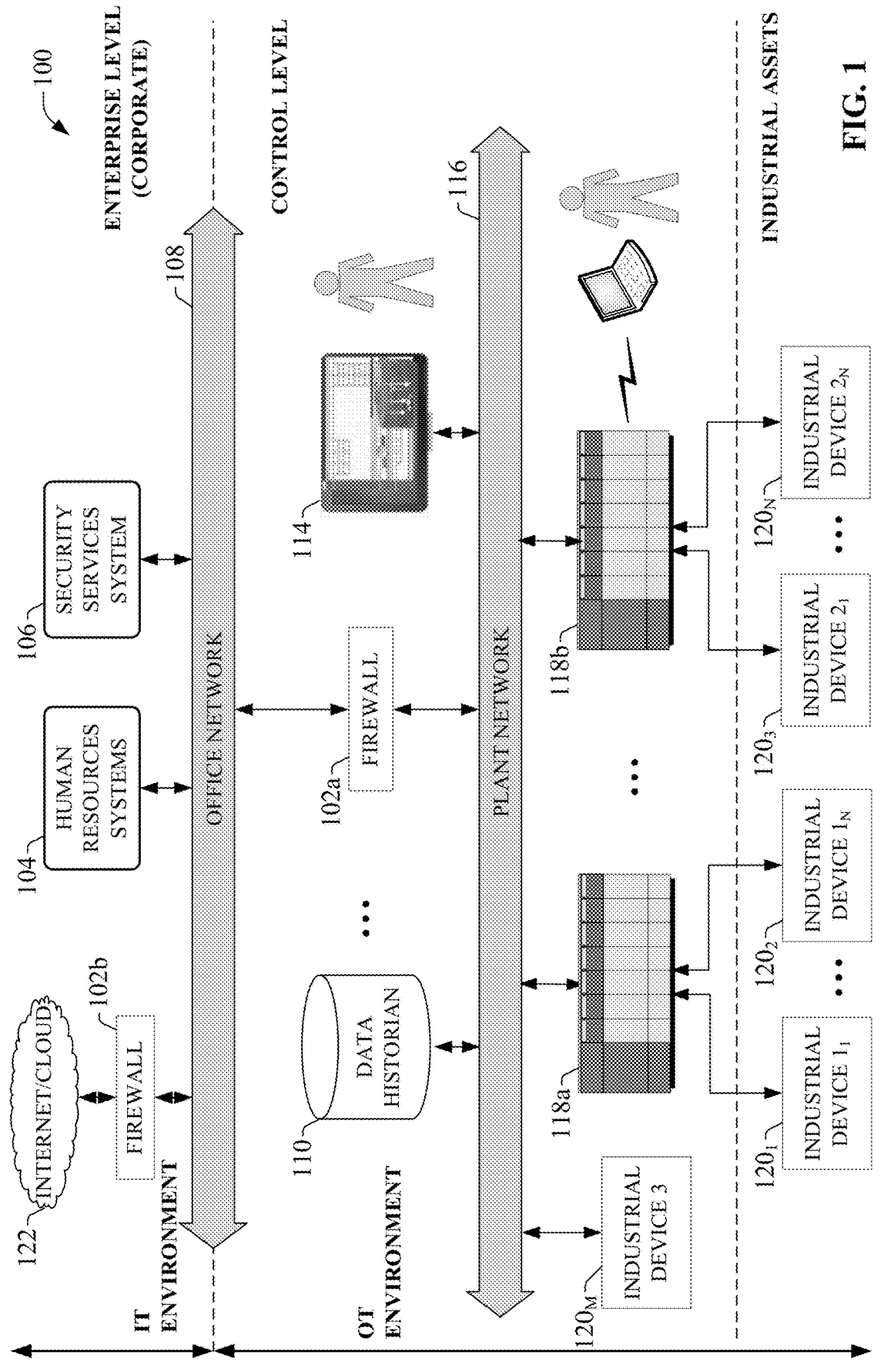
FIG. 1 is a block diagram of an example industrial control environment.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers, including cloud-based computing systems. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers, their associated I/O devices, motor drives, and other such industrial devices are central to the operation of modern automation systems. Industrial controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, C++, Python, Javascript, or other such platforms.

FIG. 1 is a block diagram of an example industrial environment 100. In this example, a number of industrial controllers 118 are deployed throughout an industrial plant environment to monitor and control respective industrial systems or processes relating to product manufacture, machining, motion control, batch processing, material handling, or other such industrial functions. Industrial controllers 118 typically execute respective control programs to facilitate monitoring and control of industrial devices 120 making up the controlled industrial assets or automation systems (e.g., industrial machines). One or more industrial controllers 118 may also comprise a soft controller executed on a personal computer, on a server blade, or another hardware platform, or on a cloud platform. Some hybrid devices may also combine controller functionality with other functions (e.g., visualization). The control programs executed by industrial controllers 118 can comprise any conceivable type of code used to process input signals read from the industrial devices 120 and to control output signals generated by the industrial controllers 118, including but not limited to ladder logic, sequential function charts, function block diagrams, structured text, C++, Python, Javascript, etc.

Industrial devices 120 may include input devices that provide data relating to the controlled industrial systems to the industrial controllers 118, output devices that respond to control signals generated by the industrial controllers 118 to control aspects of the industrial systems, or devices that act as both input and output devices. Example input devices can include telemetry devices (e.g., temperature sensors, flow meters, level sensors, pressure sensors, etc.), manual operator control devices (e.g., push buttons, selector switches, etc.), safety monitoring devices (e.g., safety mats, safety pull cords, light curtains, etc.), and other such devices. Output devices may include motor drives, pneumatic actuators, signaling devices (e.g., stack lights or other illuminated indicators, horns, message display boards, etc.), robot control inputs, valves, and the like. Some industrial devices, such as industrial device 120M, may operate autonomously on the plant network 116 without being controlled by an industrial controller 118.

Industrial controllers 118 may communicatively interface with industrial devices 120 over hardwired connections or over wired or wireless networks. For example, industrial controllers 118 can be equipped with native hardwired inputs and outputs that communicate with the industrial devices 120 to effect control of the devices. The native controller I/O can include digital I/O that transmits and receives discrete voltage signals to and from the field devices, or analog I/O that transmits and receives analog voltage or current signals to and from the devices. The controller I/O can communicate with a controller's processor over a backplane such that the digital and analog signals can be read into and controlled by the control programs. Industrial controllers 118 can also communicate with industrial devices 120 over the plant network 116 using, for example, a communication module or an integrated networking port. Exemplary networks can include the Internet, intranets, Ethernet, EtherNet/IP, DeviceNet, ControlNet, Data Highway and Data Highway Plus (DH/DH+), Remote I/O, Fieldbus, Modbus, Profibus, wireless networks, serial protocols, and the like. The industrial controllers 118 can also store persisted data values that can be referenced by the control program and used for control decisions, including but not limited to measured or calculated values representing operational states of a controlled machine or process (e.g., tank levels, positions, alarms, etc.) or captured time series data that is collected during operation of the automation system (e.g., status information for multiple points in time, diagnostic occurrences, etc.). Similarly, some intelligent devices—including but not limited to motor drives, instruments, or condition monitoring modules—may store data values that are used for control and/or to visualize states of operation. Such devices may also capture time-series data or events on a log for later retrieval and viewing.

Industrial automation systems often include one or more human-machine interfaces (HMIs) 114 that allow plant personnel to view telemetry and status data associated with the automation systems, and to control some aspects of system operation. HMIs 114 may communicate with one or more of the industrial controllers 118 over a plant network 116, and exchange data with the industrial controllers to facilitate visualization of information relating to the controlled industrial processes on one or more pre-developed operator interface screens. HMIs 114 can also be configured to allow operators to submit data to specified data tags or memory addresses of the industrial controllers 118, thereby providing a means for operators to issue commands to the controlled systems (e.g., cycle start commands, device actuation commands, etc.), to modify setpoint values, etc. HMIs 114 can generate one or more display screens through which the operator interacts with the industrial controllers 118, and thereby with the controlled processes and/or systems. Example display screens can visualize present states of industrial systems or their associated devices using graphical representations of the processes that display metered or calculated values, employ color or position animations based on state, render alarm notifications, or employ other such techniques for presenting relevant data to the operator. Data presented in this manner is read from industrial controllers 118 by HMIs 114 and presented on one or more of the display screens according to display formats chosen by the HMI developer. HMIs may comprise fixed-location or mobile devices with either user-installed or pre-installed operating systems, and either user-installed or pre-installed graphical application software.

Some industrial environments may also include other systems or devices relating to specific aspects of the controlled industrial systems. These may include, for example, one or more data historians 110 that aggregate and store production information collected from the industrial controllers 118 and other industrial devices.

Industrial devices 120, industrial controllers 118, HMIs 114, associated controlled industrial assets, and other plant-floor systems such as data historians 110, vision systems, and other such systems operate on the operational technology (OT) level of the industrial environment. Higher level analytic and reporting systems may operate at the higher enterprise level of the industrial environment in the information technology (IT) domain; e.g., on an office network 108 (which may be connected to the plant network 116 directly or via a firewall device 102) or on a cloud platform. Such higher level systems can include, for example, enterprise resource planning (ERP) systems that integrate and collectively manage high-level business operations, such as finance, sales, order management, marketing, human resources, or other such business functions. As another example IT-level system, a Manufacturing Execution System (MES) can monitor and manage control operations on the control level given higher-level business considerations. Reporting systems, which can also reside on the IT level, can collect operational data from industrial devices on the plant floor and generate daily or shift reports that summarize operational statistics of the controlled industrial assets.

An industrial enterprise or business may also operate corporate-level systems on the IT level. Such corporate-level systems can include human resources (HR) systems 104 on which employee records are electronically stored and maintained. An example HR system 104 may comprise one or more servers or databases, or may execute on a secure cloud platform. An example employee record maintained by such HR systems 104 may comprise such information as an employee's name; residential address; hire date; current employment status; a department, facility, or location in which the employee works; a current work shift during which the employee is expected to be on-premises; a classification or role of the employee (e.g., operator, engineer, manager, finance officer, vice president, etc.); training records or certifications held by the employee; or other such employee-specific information. Businesses use such HR systems 104 to track workforce, manage payroll, maintain employee mailing lists, generate reports, or for other purposes.

Some industrial enterprises may also maintain a security services system 106 that defines and enforces enterprise-wide security policies. Similar to HR systems 104, security services systems 106 can operate on one or more servers or on a cloud platform. Security services system 106 can serve as a corporate-level security authority, and in some cases may be integrated with the HR systems 104 in order to define and enforce access security policies for the enterprise; e.g., to define access policies for buildings that make up the industrial enterprise. Such systems 106 may define, for each building of the enterprise, which employees defined in the HR systems 104 are permitted to access that building. The security services system 106 may also interface with the buildings' access control systems to selectively lock or unlock doors of the buildings in accordance with the defined security policies. In this regard, the security services system 106 may control the access control systems such that a door of a given building will only unlock if an employee identification system associated with the door (e.g., a badge reader, a biometric scanner, etc.) receives authenticated employee identification information that corresponds with an employee who is permitted to enter that building per the defined security policy. Some security services systems 106 may also manage IT-level network security; e.g., by acting as a certificate authority that regulates access to the corporate network (e.g., office network 108).

Returning to the industrial control level within a plant facility, an industrial automation system—comprising one or more industrial controllers 118, associated industrial devices 120, and the machinery that these monitoring and control devices operate—typically include associated safety systems that monitor for potentially unsafe scenarios and transition the automation systems to safe states in response to detection of a potentially hazardous condition. These safety systems can include a number of safety input devices designed to detect when a human has intruded within a protected area near a hazardous machine. Such safety input devices can include, for example, light curtains, photo-eyes, safety mats, optical safety sensors, or other such devices capable of detecting human presence within a protected area or a protected portion of a running machine. The safety input devices can be monitored by a safety relay or safety controller, which can disconnect power from the machine—or otherwise place the machine in a safe state (e.g., a slow operating state)—in response to detecting that one or more of the safety input devices has detected presence of a human within a protected area while the machine is operating.

Industrial safety standards require that these safety systems perform at or above a minimum level of reliability in accordance with a minimum Safety Integrity Level (SIL) defined for the automation system being protected. The minimum SIL requirement for an industrial safety system dictates that the safety system must be able to reliably detect human presence with at least a defined minimum degree of accuracy and repeatability, and must also ensure hazard mitigation even if one or more devices of the safety system experience failures.

There are several emerging safety applications for dynamic industrial safety, including those being developed to take advantage of increased interconnectivity and smart technology of Industry 4.0. In the long term, limits on the capabilities of safety relays or safety controllers may prevent those devices from supporting the demands of future safety applications, particularly dynamic safety application that fuse safety sensor data from multiple disparate sources such as vision systems, robotics, and autonomous vehicles. Some of these limitations can be overcome by migrating industrial safety computing to the cloud. However, to be viable, cloud-based industrial safety solutions will have to be realized on conventional IT servers and hardware (e.g., commercial off-the-shelf, or COTS, computer hardware,) which are not typically designed with the enhanced redundancy and reliability needed to satisfy the strict requirements of SIL safety (e.g., IEC 61508 or other standards that dictate industrial safety requirements from a hardware perspective).

To address these and other issues, one or more embodiments described herein provide cloud-based industrial safety systems that execute safety applications and interface with industrial assets on the plant floor using software encoded processing (SEP). The use of SEP ensures safety reliable execution of safety applications and data communication software by redundantly executing native code (e.g., operands, operators, etc.), thereby implementing a level of software-based fault detection that is independent of the hardware on which the safety application operates. This allows the cloud-based industrial safety applications to achieve at least SIL3 safety ratings for safety services even though the safety applications are executed using standard COTS hardware that is commonplace in the server market. The use of SEP to reliably execute safety software on the cloud can make possible a wide variety of safety applications that would be difficult to implement using purely localized industrial safety systems.

Figure 2:
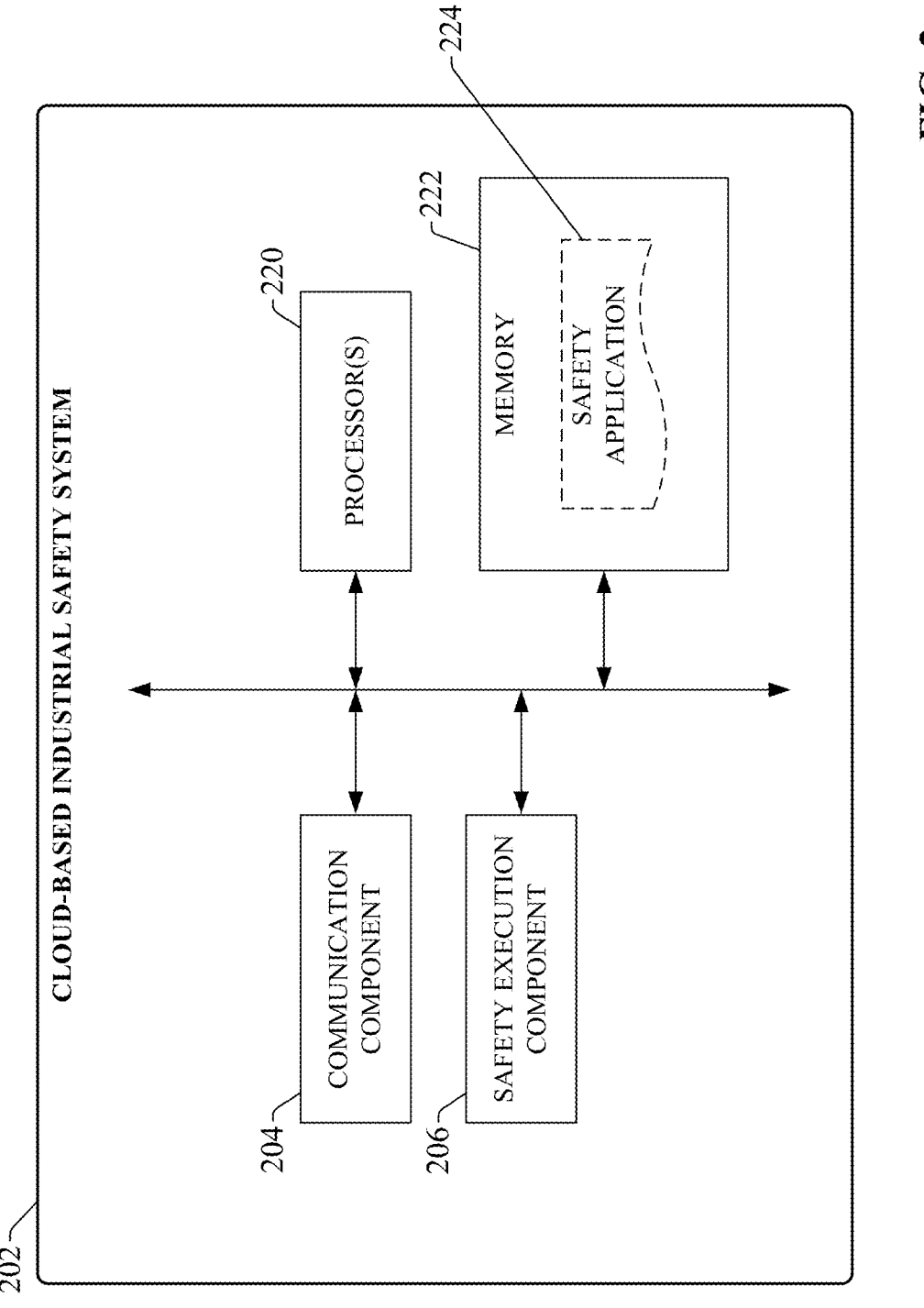
FIG. 2 is a block diagram of an example cloud-based industrial safety system.

FIG. 2 is a block diagram of an example cloud-based industrial safety system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Industrial safety system 202 can include a communication component 204, a safety execution component 206, one or more processors 220, and memory 222. In various embodiments, one or more of the communication component 204, safety execution component 206, the one or more processors 220, and memory 222 can be electrically and/or communicatively coupled to one another to perform one or more of the functions of the industrial safety system 202. In some embodiments, components 204 and 206 can comprise software instructions stored on memory 222 and executed by processor(s) 220. Industrial safety system 202 may also interact with other hardware and/or software components not depicted in FIG. 2. For example, processor(s) 220 may interact with one or more external user interface devices, such as a keyboard, a mouse, a display monitor, a touchscreen, or other such interface devices.

Communication component 204 can be configured to exchange data between the industrial safety system 202 and industrial devices and assets within one or more plant facilities. This data communication can be performed across any intervening public or private networks between the cloud-based safety system 202 and the industrial devices, including the internet and any IT and OT networks at the plant facility. Safety execution component 206 can be configured to execute one or more industrial safety applications 224 that monitor the industrial environments at the plant facilities based on data received from the industrial assets and send safety control outputs or messages based on results of the safety processing. One or both of the communication component 204 or the safety execution component 206 can be configured to leverage SEP techniques to ensure a high level of software-based, hardware-independent fault detection in both the execution of the safety application 224 and the communication between the safety system 202 and the industrial assets.

The one or more processors 220 can perform one or more of the functions described herein with reference to the systems and/or methods disclosed. Memory 222 can be a computer-readable storage medium storing computer-executable instructions and/or information for performing the functions described herein with reference to the systems and/or methods disclosed.

Figure 3:
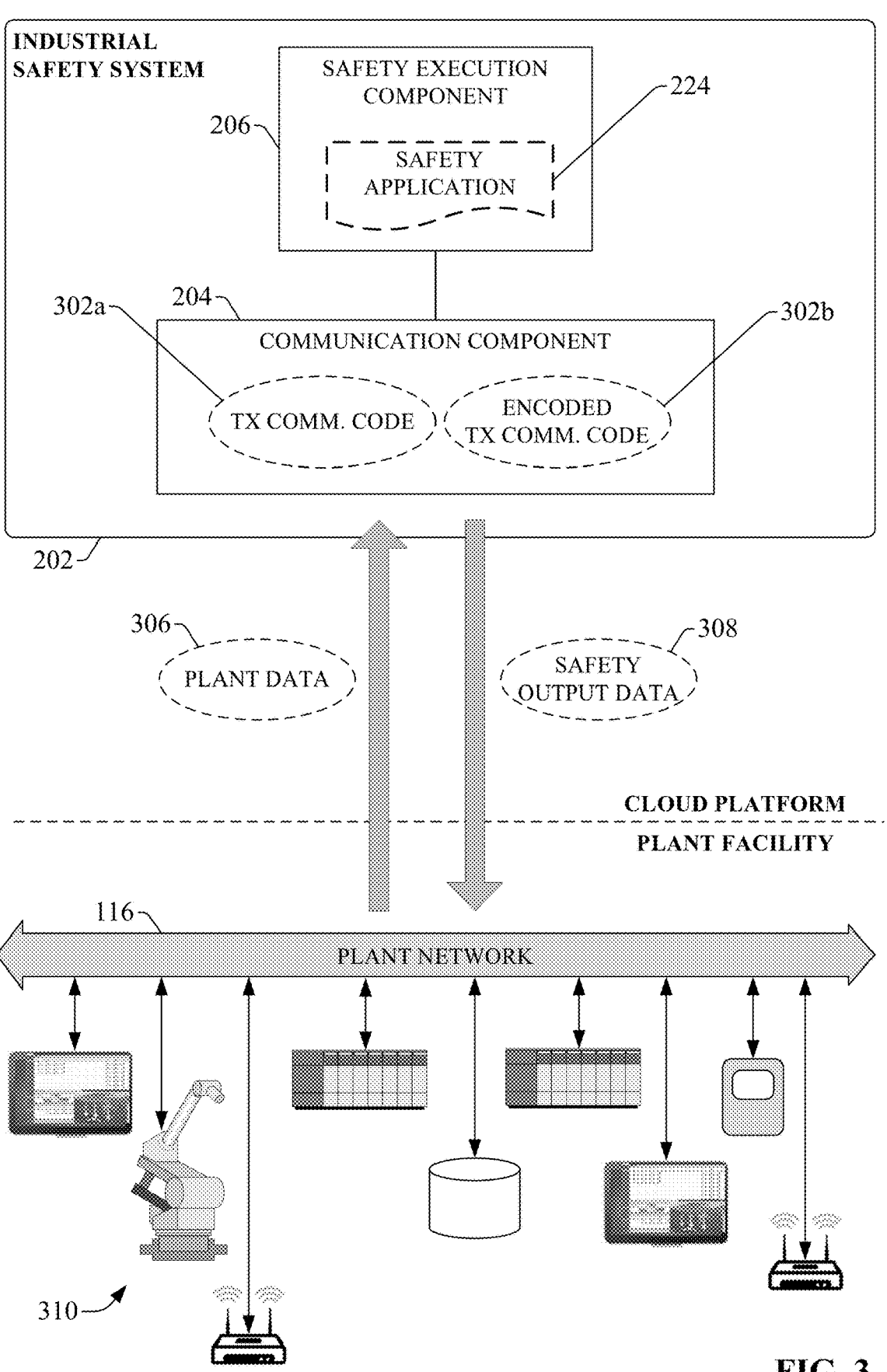
FIG. 3 is a diagram illustrating a generalized architecture in which an industrial safety system executes on a cloud platform and provides safety monitoring and control for an industrial plant facility.

FIG. 3 is a diagram illustrating a generalized architecture in which industrial safety system 202 executes on a cloud platform and provides safety monitoring and control for an industrial plant facility. In this example, industrial safety system 202 resides on a cloud platform and executes as a set of cloud-based safety services. The cloud platform can be any infrastructure that executes shared computing services. For example, the cloud platform can be a public cloud accessible via the Internet by devices having Internet connectivity and appropriate authorizations to utilize the safety services. In some scenarios, the cloud platform can be provided by a cloud provider as a platform-as-a-service (PaaS), and the safety system 202 can reside and execute on the cloud platform as a cloud-based service. In some such configurations, access to the cloud platform and safety services can be provided to customers as a subscription service by an owner of the safety services. Alternatively, the cloud platform can be a private cloud operated internally by the industrial enterprise (the owner of the plant facility). An example private cloud platform can comprise a set of servers hosting the safety services and residing on a corporate network protected by a firewall.

In general, the safety system's communication component 204 remotely interfaces with industrial assets 310 within the plant facility and collects plant data 306 from those assets for the purposes of safety monitoring. The industrial assets 310 may comprise, for example, PLCs, motor drives (e.g., variable frequency drives), vision systems, safety relays, human-machine interface terminals, industrial robot controllers, safety input devices (e.g., light curtains, safety sensors, emergency stop push buttons, safety mats, pull cords, etc.), data historians, user-worn devices (e.g., electronic badges, wearable computers or augmented reality devices), autonomous vehicle controllers, or other such industrial assets. Industrial assets 310 can also include the network infrastructure devices (e.g., routers, hubs, switches, firewalls, etc.) that make up the backbone of the plant network 116 and which manage data transfer and security between network devices and network segments. Example plant data 306 collected and monitored by the safety system 202 can include, but is not limited to, states of safety input devices, digital or analog data values obtained from industrial controllers (e.g., tag data) or industrial robots, locations and speeds of humans or autonomous guided vehicles (AGVs), vision system outputs, data relating to motor or motion system states generated by variable frequency drives or motion controllers, three-dimensional optical sensor data, or other such data 306.

The safety execution component 206 processes this plant data 306 based on execution of a safety application 224 to identify potentially unsafe conditions that necessitate initiation of a hazard mitigation action. Based on this safety processing, the safety execution component 206 can generate safety output data 308 directed to selected industrial assets 310 to initiate safety mitigation actions as necessary. This safety output data 308 can be configured to initiate such safety actions as placing an industrial machine or robot in a safe state (e.g., a stopped mode or a slow operating mode), open a safety contactor to disconnect power from a hazardous machine, rerouting a path of an autonomous vehicle to avoid possible injury or collision, or other such safety measures.

As will be described in more detail herein, different types of safety applications 224 can be executed by the safety execution component 206 in various embodiments. In some embodiments, safety monitoring functions that are typically performed by industrial safety relays on the plant floor (e.g., industrial safety logic) can be offloaded to the industrial safety system 202 for execution on the cloud platform. For example, the cloud-based safety system 202 can monitor the states of various safety input devices (e.g., safety sensors, light curtains, safety mats, emergency stop push buttons, pull cords, etc.) and control the states of one or more safety contactors based on the states of these safety input devices. In other embodiments, more complicated safety applications 224 can be executed by the safety system 202, including but not limited to enforcement of fenceless perimeter time guarding, autonomous vehicle control, biometric or environmental monitoring, enforcement of minimum operator requirements, implementation of dynamic human safety bubbles, or other such safety applications.

To ensure that execution of the safety application 224 and communication of data between the system 202 and the industrial assets are performed with a high degree of reliability that satisfies the requirements of SIL safety even if non-safety hardware (e.g., COTS computer hardware) is used to implement the safety system 202, one or both of the safety execution component 206 or the communication component 204 can use SEP techniques to redundantly execute the safety processing and data communication code.

Figure 4:
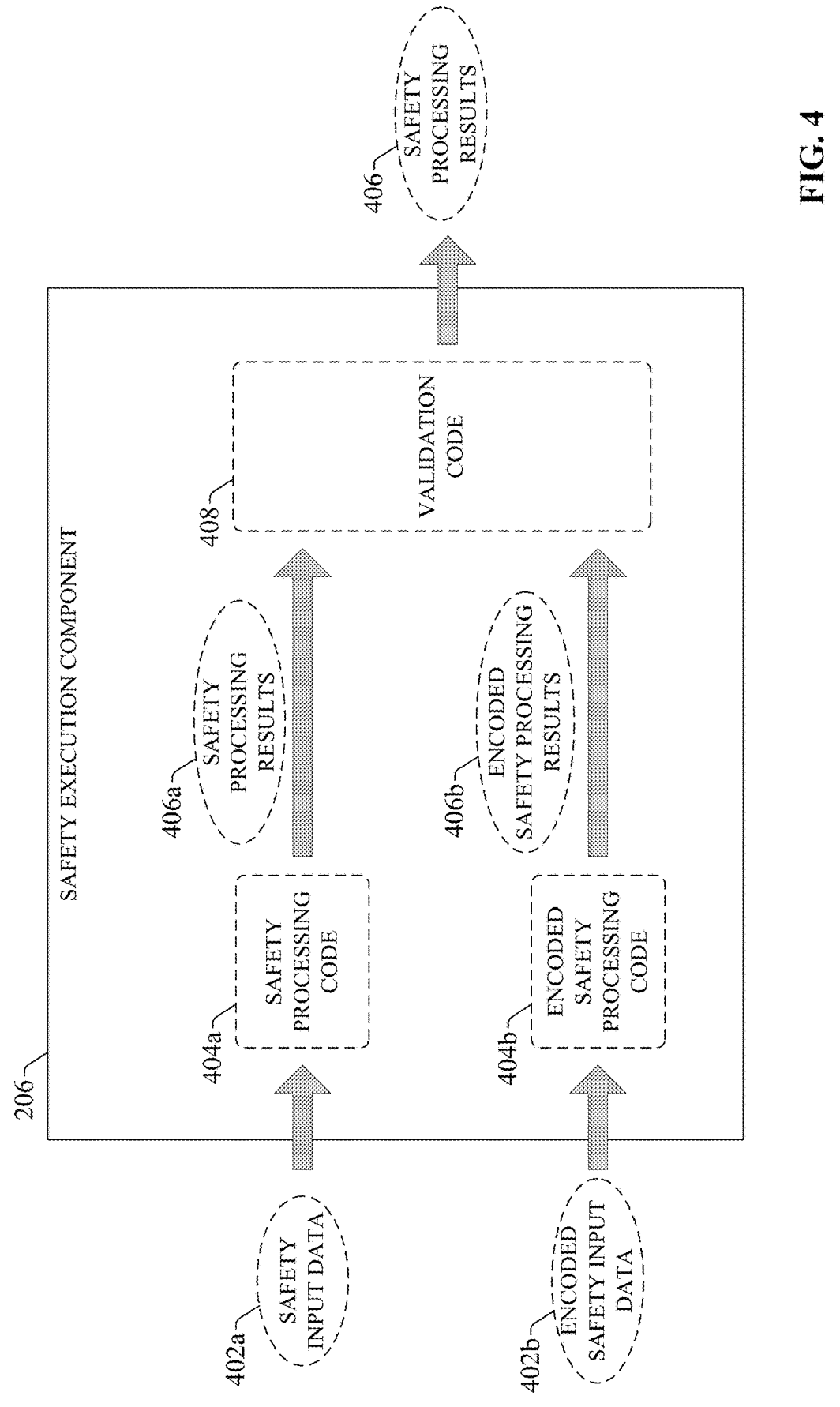
FIG. 4 is a diagram illustrating an example processing flow carried out by a safety execution component of an industrial safety system in which SEP is used to execute a safety application with a high level of safety integrity.

FIG. 4 is a diagram illustrating an example processing flow carried out by the safety execution component 206 in which SEP is used to execute a safety application with a high level of safety integrity. In this example, the safety execution component 206 executes safety processing code 404a, which is part of the safety application 224 being executed by the system 202 (examples of which are described in more detail below). This safety processing code 404a processes safety input data 402a, which may comprise plant data 306 as well as other relevant data obtained from other sources as needed, depending on the safety application 224 being executed.

Since the safety application 224 must be executed in a reliable and error-free manner that satisfies the requirements of prevailing industrial safety standards (e.g., IEC 61508), the safety processing code 404a should be executed in a manner that ensures a high level of safety integrity (e.g., SIL3 rated processing), such that execution errors in the safety processing code 404a are reliably detected and handled. However, the cloud-based industrial safety system 202 may be implemented on a cloud-based system that does not include dedicated safety hardware, since cloud infrastructure hardware is not typically required to comply with the more stringent safety integrity requirements of OT-level equipment. To address this issue and to facilitate industrial safety processing with a high level of safety integrity, some embodiments of the safety execution component 206 can be configured to use software encoded processing (SEP) to process the safety input data 402a with a high level of safety reliability even if non-safety hardware (e.g., COTS computer hardware) is used to implement the safety system 202.

In general, SEP can implement a level of software-based fault detection that is independent of the hardware on which the safety system 202 operates. According to an example implementation, the safety execution component 206 of the safety system 202 can execute both the primary safety processing code 404a used to process safety input data 402a as well as an arithmetically encoded version of the safety processing code 404b. The two versions of the safety processing code—primary and encoded—can process redundant versions of the safety input data 402a and 402b, resulting in redundant versions of the safety processing results 406a and 406b. The safety execution component 206 can execute validation code 408 that verifies these results 406a and 406b against one another before outputting the validated safety processing results 406. In some embodiments, the primary and encoded versions of the safety processing code can be executed in respective different CPU cores in parallel.

For a given set of safety input data 402 to be processed, each version of the code 404a and 404b processes a version of the input data 402 to yield safety processing results 406. The primary version of the safety processing code 404a receives the original safety input data 402a as input, while the encoded version of the safety processing code 404b receives an appropriately encoded version of the input data 402b as input. Encoded safety input data 402b is encoded by the safety execution component 206 using the same arithmetic encoding that was used to encode the encoded version of the safety processing code 404b.

Any suitable type of encoding can be used to generate the encoded version of the safety processing code 404b. In an example arithmetic encoding approach, operands and operators of the primary safety processing code 404a can be scaled using a prime number to yield the encoded version of the safety processing code 404b. Other types of encoding can also be used to generate the encoded safety processing code 404b without departing from the scope of one or more embodiments. The same type of encoding used to create encoded safety processing code 404b is also applied to the safety input data 402a to obtain encoded safety input data 402b.

Safety processing code 404a and encoded safety processing code 404b process the safety input data 402a and the encoded safety input data 402b, respectively, to generate safety processing results 406. The nature of these safety processing results 406 depends on the type of safety application 224 being executed by the safety system 202. For example, safety processing results 406 may represent a decision as to whether to disconnect power from a hazardous machine; revised routing information for an AGV designed to mitigate a possible collision; a predicted future trajectory of a human, machine, and/or AGV; a predicted time and location of an intersection between a human's path of travel and a hazardous entity; virtual safety bubble data; or other such processing outputs. The primary safety processing code 404a generates safety processing results 406a, while encoded safety processing code 404b generates encoded safety processing results 406b.

Validation code 408 can verify that the safety processing code 404a successfully executed without errors by comparing the two sets of safety processing results 406a and 406b—or calculated properties of the two sets of safety processing results 406a and 406b—and validating error-free execution if results of the comparison satisfy a defined criterion. According to an example verification technique, if the encoded safety processing code 404b was arithmetically scaled using a scale factor, the verification code 408 can scale down the values contained in the encoded safety processing results 406b by the same scale factor and determine whether the resulting values are equal to their corresponding values in the primary results 406a.

According to another example approach, the validation code 408 can calculate a first checksum for the encoded processing results 406b and a second checksum for the primary processing results 406a using the same checksum calculation method, and verify that the first checksum of the encoded processing results 406b is greater than the checksum of the primary processing results 406a by a multiple equal to the scale factor used to encode the encoded safety processing code 404b. Other types of SEP validation techniques—which may depend on the encoding technique used to obtain encoded safety processing code 404b—are also within the scope of one or more embodiments. For example, in some embodiments, other pieces of information—rather than checksums—can be calculated or deduced from the content of the encoded processing results 406b and used to validate error-free execution of safety processing code 404a.

If the validation technique applied by validation code 408 verifies error-free execution of the safety processing code 404a based on comparison of the primary results 406a and the encoded results 406b, the safety execution component 206 outputs or further processes the safety processing results 406 in accordance with the safety application 224. Otherwise, if the results of comparing the two sets of results 406a and 406b do not satisfy the validation criterion, the safety system 202 can generate an error notification and will not permit the safety processing results 406 to be used in connection with safety monitoring and processing. In some embodiments, if the validation criterion is not satisfied, the safety system 202 can place one or more hazardous machines in respective default safe states to mitigate the possibility of injury or damage as a result of faulty safety processing.

Since the communication link between the cloud-based safety system 202 and the industrial assets on the plant floor represents a convergence of non-safety-rated hardware and OT-level safety, safety output data generated by the safety system 202 (e.g., instructions to disconnect power from hazardous machinery, instructions for reprogramming the planned route of an AGV to avoid collisions, etc.) should be communicated to the plant-floor assets using a protocol that ensures a high level of safety integrity (e.g., SIL3 rated communications), such that execution errors in the communication code used to send the safety outputs are reliably detected and handled. To facilitate communication of safety output data from the cloud-based safety system 202 with a high level of safety integrity, some embodiments of the safety system 202 can also be configured to use SEP to send the safety output data to the plant floor assets with a high level of safety reliability even if non-safety hardware (e.g., commercial off-the-shelf, or COTS, computer hardware) is used to implement the safety system 202.

Figure 5:
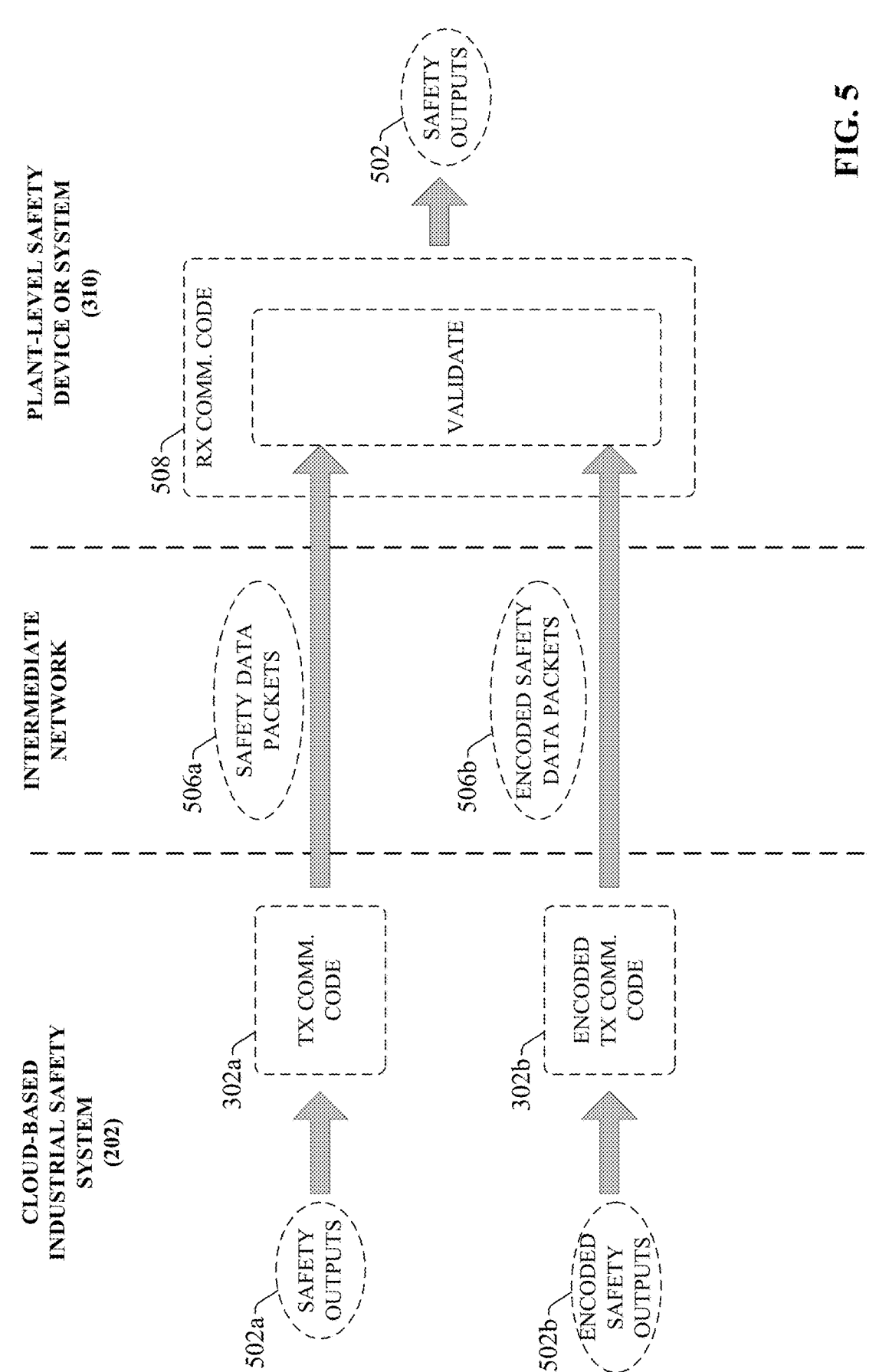
FIG. 5 is a diagram illustrating an example communication flow in which SEP is used to send safety outputs from a cloud-based industrial safety system to plant-level devices or systems with a high level of safety integrity.

FIG. 5 is a diagram illustrating an example communication flow in which SEP is used to send safety outputs 502 from the cloud-based industrial safety system 202 to the plant-level devices or systems with a high level of safety integrity. Similar to the safety processing scenario depicted in FIG. 4, the safety system 202 can employ redundant processing of the transmission communication code 302 used to communicate safety outputs 502 to the plant floor to ensure error-free execution of the communication software. According to an example implementation, the communication component 204 of the safety system 202 can execute both the primary transmission (Tx) communication code 302a used to communicate safety outputs 502a to the plant-level devices as well as an arithmetically encoded version of the Tx communication code 302b. The two versions of the communication code—primary and encoded—can send redundant versions of the safety outputs 502 to the plant-level devices, and these redundant versions can be verified against one another by receipt (Rx) communication code 508 executed by the receiving industrial device or system.

Safety outputs 502 can be any type of output data generated by the safety execution component 206 in connection with executing the safety application 224 and its associated safety processing code 404, and may be based on the validated safety processing results 406 described above. Example safety outputs 502 can include, but are not limited to, instructions to disconnect power from hazardous machinery or to otherwise place a machine in a safe operating state, instructions for reprogramming the planned route of an AGV or industrial robot to avoid collisions, notifications directed to one or more client devices informing of a safety risk or hazardous event, or other such outputs.

For a given set of safety outputs 502a generated by the safety execution component 206, each version of the Tx communication code 302a and 302b processes a version of the safety outputs 502 to yield safety data packets 506 that can be transmitted to the plant-level devices or systems via one or more intermediate networks (e.g., the internet, office network 108, plant network 116, etc.). The primary version of the Tx communication code 302a receives the original set of safety outputs 502a as input, while the encoded version of the Tx communication code 302b receives an appropriately encoded version of the safety outputs 502b as input. Encoded safety outputs 502b are encoded using the same arithmetic encoding that was used to encode the encoded version of the Tx communication code 302b.

As with the encoded safety processing code 404b, any suitable type of encoding can be used to generate the encoded version of the Tx communication code 302b. In an example arithmetic encoding approach, operands and operators of the primary Tx communication code 302b can be scaled using a prime number to yield the encoded version of transmission communication code 302b. Other types of encoding can also be used to generate the encoded communication code 302b without departing from the scope of one or more embodiments. The same type of encoding used to create encoded communication code 302b is also applied to safety outputs 502a to obtain encoded safety outputs 502b.

Communication code 302a and encoded communication code 302b process the safety outputs 502a and the encoded safety outputs 502b, respectively, to generate safety data packets 506 that will be sent over the intermediate network(s) to the plant-level industrial devices or systems. The primary communication code 302a generates safety data packets 506a, while encoded communication code 302b generates encoded safety data packets 506b. The safety system's communication component 204 sends these packets 506a and 506b to the plant-level devices or systems for validation and translation back to safety outputs 502. In some embodiments, the two sets of packets 506a and 506b can be sent in redundant time segments or may be sent substantially simultaneously using separate cores and communication channels.

Upon receipt of the packets 506a and 506b, receipt communication code 508 executed by the receiving plant-level industrial device, appliance, or system can verify that the Tx communication code 302 executed without errors by comparing the two sets of packets 506a and 506b—or selected properties of the two sets of packets 506a and 506b—and validating error-free execution if results of the comparison satisfy a defined criterion. According to an example verification technique, if the encoded communication code 302b was arithmetically scaled using a scale factor, the receipt communication code 508 can scale down the values contained in the encoded packets 506b by the same scale factor and determine whether the resulting values are equal to their corresponding values in the primary packets 506a.

According to another example approach, rather than sending both the primary packets 506a and the encoded packets 506b to the plant-level devices, the cloud-level safety system 202 can calculate a checksum for the encoded packets 506b and send this checksum together with the primary packets 506a, without sending the encoded packets 506b themselves to the plant-level devices. Upon receipt of the primary packets 506a and the checksum for the encoded packets 506b, the receipt communication code 508 can calculate a checksum for the primary packets 506a using the same checksum calculation method used to obtain the checksum for the encoded packets 506b, and verify that the received checksum of the encoded packets 506b is greater than the calculated checksum of the primary packets 506a by a multiple equal to the scale factor used to encode the encoded communication code 302b. Other types of SEP validation techniques—which may depend on the encoding technique used to obtain encoded communication code 302b—are also within the scope of one or more embodiments. For example, in some embodiments, other pieces of information—rather than checksums—can be calculated or deduced from the content of the encoded packets and used to validate error-free transmission.

If the validation technique applied by receipt communication code 508 verifies error-free execution of the communication code 302 based on comparison of the primary packets 506a and the encoded packets 506b, the receiving plant-level devices or systems can translate the primary packets 506a to obtain and process the safety outputs 502. Otherwise, if the results of comparing the two sets of packets 506a and 506b do not satisfy the validation criterion, the plant-level SA devices can generate an error notification and will not accept or process the safety outputs 502 contained in the packets 506. In some embodiments, if the validation criterion is not satisfied, the receiving industrial device can place one or more associated hazardous machines in respective default safe states to mitigate the possibility of injury or damage as a result of unreliable communication with the cloud-based industrial safety system 202.

Although FIG. 5 only depicts the two versions of Tx communication code 302a and 302b being executed on the safety system 202 while the Rx communication code 508 is executed on the receiving plant-floor device or system—thereby validating error-free communication from the safety system to the plant-floor devices—SEP techniques can also be used to validate communication from the plant-floor devices to the safety system 202. To this end, any plant-floor device or system that provides plant data 306 to the safety system 202 can execute redundant versions of its own Tx communication code 302 for transmission of data from the device to the safety system 202, and the safety system 202 can execute its own version of Rx communication code 508 to validate the incoming plant data 306.

The use of SEP as a fault detection mechanism can ensure safety-rated processing of safety applications and communication of associated safety processing results from the cloud-based industrial safety system 202 to the plant-level devices even if the safety system 202 is implemented on non-safety-rated COTS hardware. In some embodiments, the use of SEP may yield a safety rating of SIL3 or higher for safety processing reliability as well as for the communication channel between the safety system 202 and the plant-level devices. To further improve the safety integrity of the safety output communications, timing related faults such as timeouts—which are not addressed by software encoding—can be monitored by a safety card reader or other similar input or output device.

Figure 6:
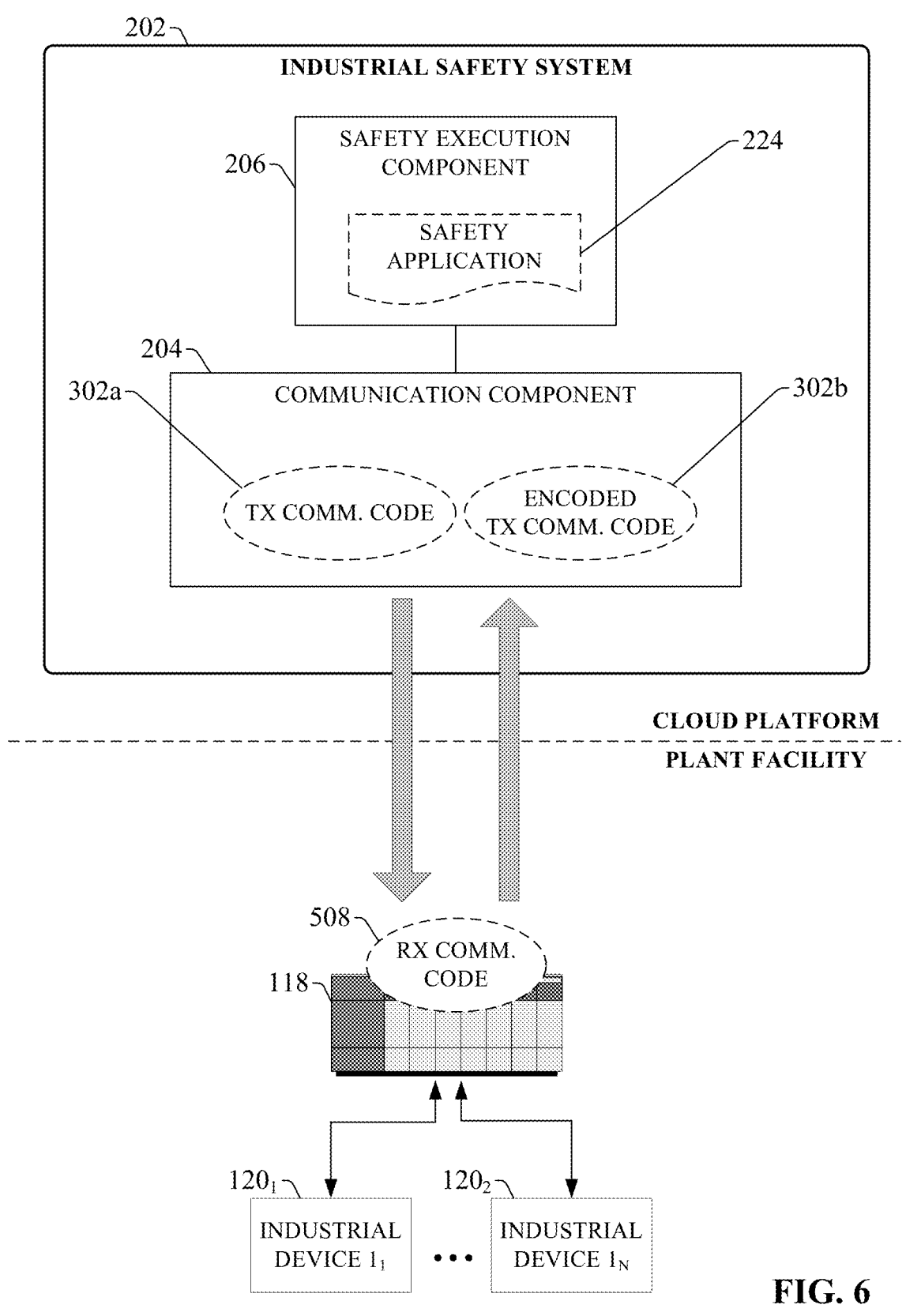
FIG. 6 is a diagram illustrating data exchange between a safety system executing on a cloud platform and an industrial controller.

To facilitate remote safety monitoring and hazard mitigation, the cloud-based industrial safety system 202 can exchange data (e.g., plant data 306, safety output data 308, safety outputs 502, etc.) with substantially any type of industrial device, system, or appliance at one or more industrial facilities. FIG. 6 is a diagram illustrating data exchange between the safety system 202 executing on a cloud platform and an industrial controller 118. In addition to using SEP to execute the safety application 224 at a level of integrity that satisfies the requirements of SIL safety, as described above in connection with FIG. 4, the communication component 204 uses SEP to ensure safety reliability of the communication link between the safety system 202 and the industrial controller 118. To this end, the industrial controller 118 is configured to execute the Rx communication code 508, which receives and validates safety data packets 506 from the safety system 202 as described above in connection with FIG. 5. If the industrial controller 118 also provides data to the safety system 202 for safety monitoring purposes, the controller 118 can also be configured with primary and encoded versions of Tx communication code 302 for sending redundant versions of the data (or encoded checksum data) to the safety system 202, which validates the integrity of the data transfer using its own Rx communication code 508.

Although FIG. 6 depicts a data link between the safety system 202 and an industrial controller 118, the safety system 202 can establish SEP-validated communication links with other types of devices, systems, or appliances in the industrial facility that act as data input or output devices for the system 202, including but not limited to safety relays, safety input devices (e.g., emergency stop push buttons, light curtains, safety sensors, safety mats, safety pull cords, etc.), robot controllers, AGV controllers, vision systems, contactors, telemetry devices (e.g., temperature meters, flow meters, fill meters, pressure meters, etc.), three-dimensional or two-dimensional optical safety sensors, or other such devices.

Figure 7:
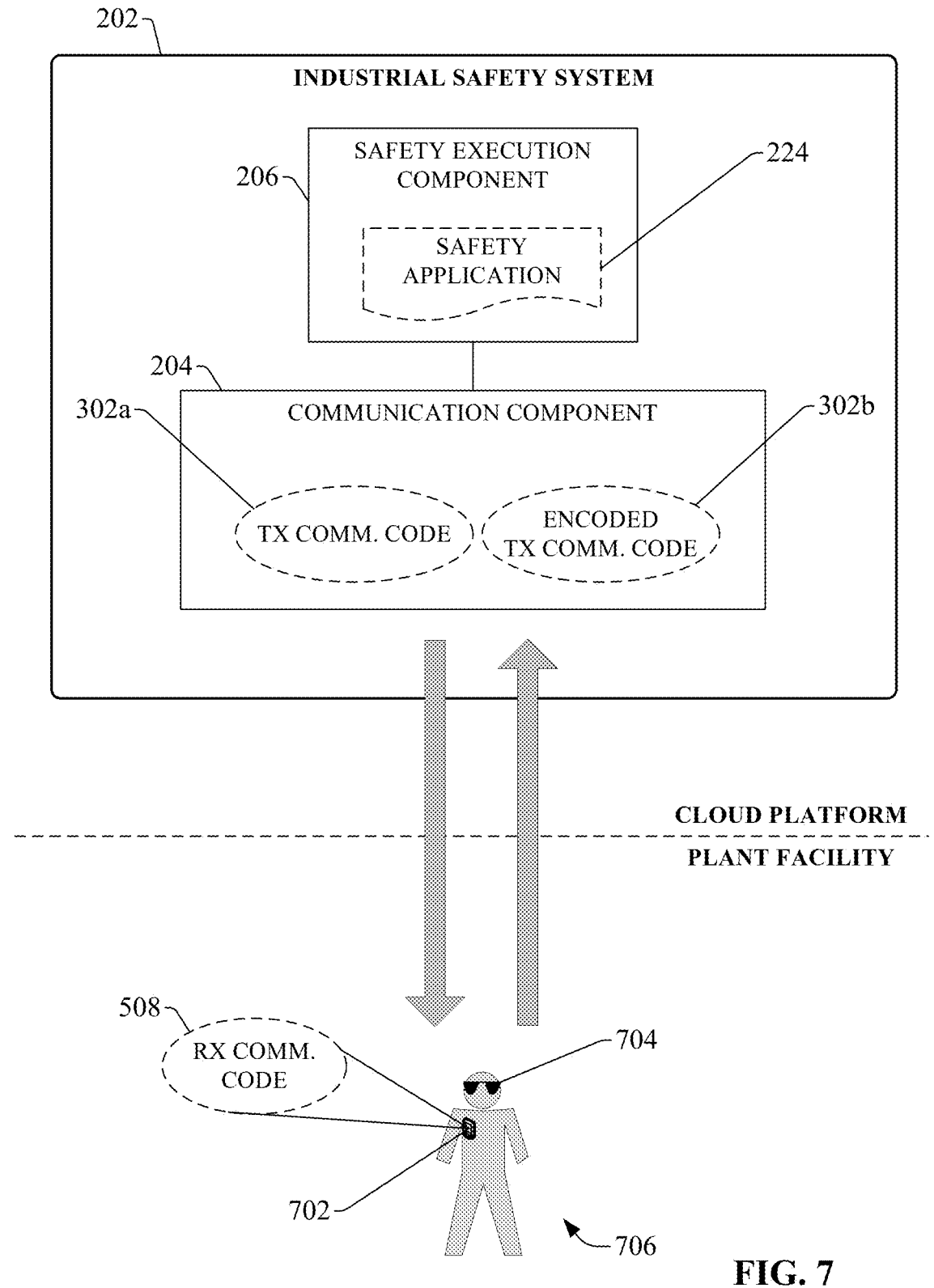
FIG. 7 is a diagram illustrating communication between an industrial safety system and one or more personal devices carried by a person within a plant facility.

Depending on the type of safety application 224 being executed, the safety system 202 may also interface with personal devices carried by human personnel within the plant facility. FIG. 7 is a diagram illustrating communication between the industrial safety system 202 and one or more personal devices carried by a person 706 within a plant facility. Example personal devices that can be carried by a person and tracked by the industrial safety system 202 can include, for example, an electronic badge 702 or a wearable appliance 704 that that generates identity and location data for the person 706. In addition to generating identity and location data, the wearable appliance 704 can also be configured to generate augmented reality presentations that are overlaid over the person's field of view. Similar to the industrial devices discussed above in connection with FIG. 6, any of the personal devices carried by the person 706 and monitored by the safety system 202 can execute Rx communication code 508 for verifying reliability of communications from the safety system 202 and/or primary and encoded Tx communication code 302a and 302b for reliably sending data to the safety system 202 (e.g., user identity data, current location data, orientation data indicating a current orientation of the user, etc.).

Figure 8:
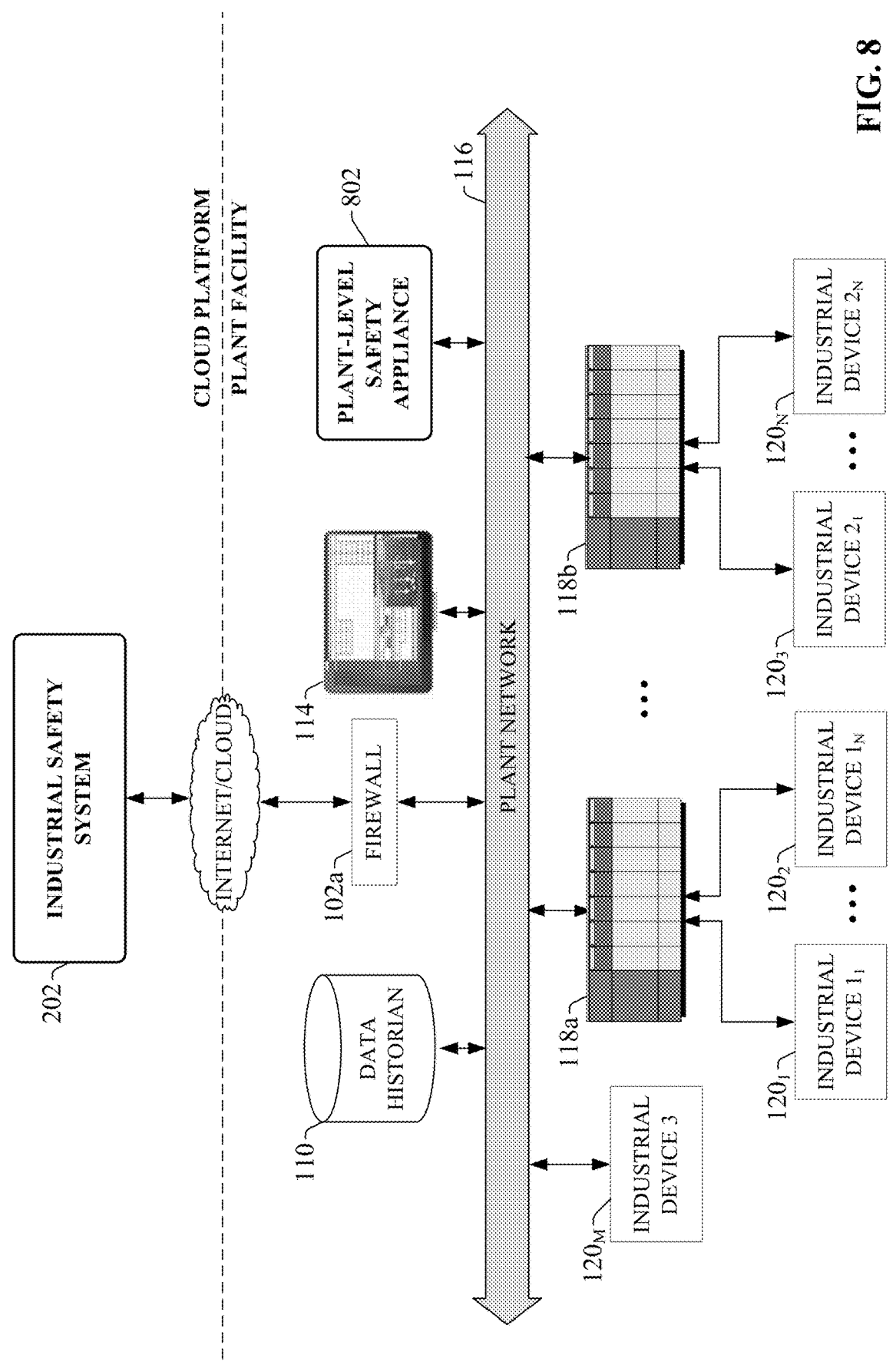
FIG. 8 is a diagram of an example architecture in which a cloud-based industrial safety system remotely interfaces with an intermediate plant-level safety appliance that resides on a plant network of an industrial facility.

FIG. 8 is a diagram of another example architecture in which the cloud-based industrial safety system 202 remotely interfaces with an intermediate plant-level safety appliance 802 that resides on the plant network 116 of an industrial facility. In this example, rather than exchanging data directly with the industrial devices and/or personal devices, the safety system 202 interfaces with the local safety appliance 802, which collects data from the relevant industrial devices or personal devices and sends this aggregated data to the safety system 202 for processing by the safety application 224. The safety system 202 sends its safety outputs 502 to the plant-level safety appliance 802, which either directs the safety outputs 502 to the intended target device or controls the state of one or more safety devices in accordance with instructions contained in the safety outputs 502. In this way, the safety appliance 802 acts as a gateway between the plant-level industrial systems and the cloud-based safety system 202. As in the architectures discussed above, SEP is used to validate error-free communication between the safety system 202 and the plant-level safety appliance 802.

Figure 9:
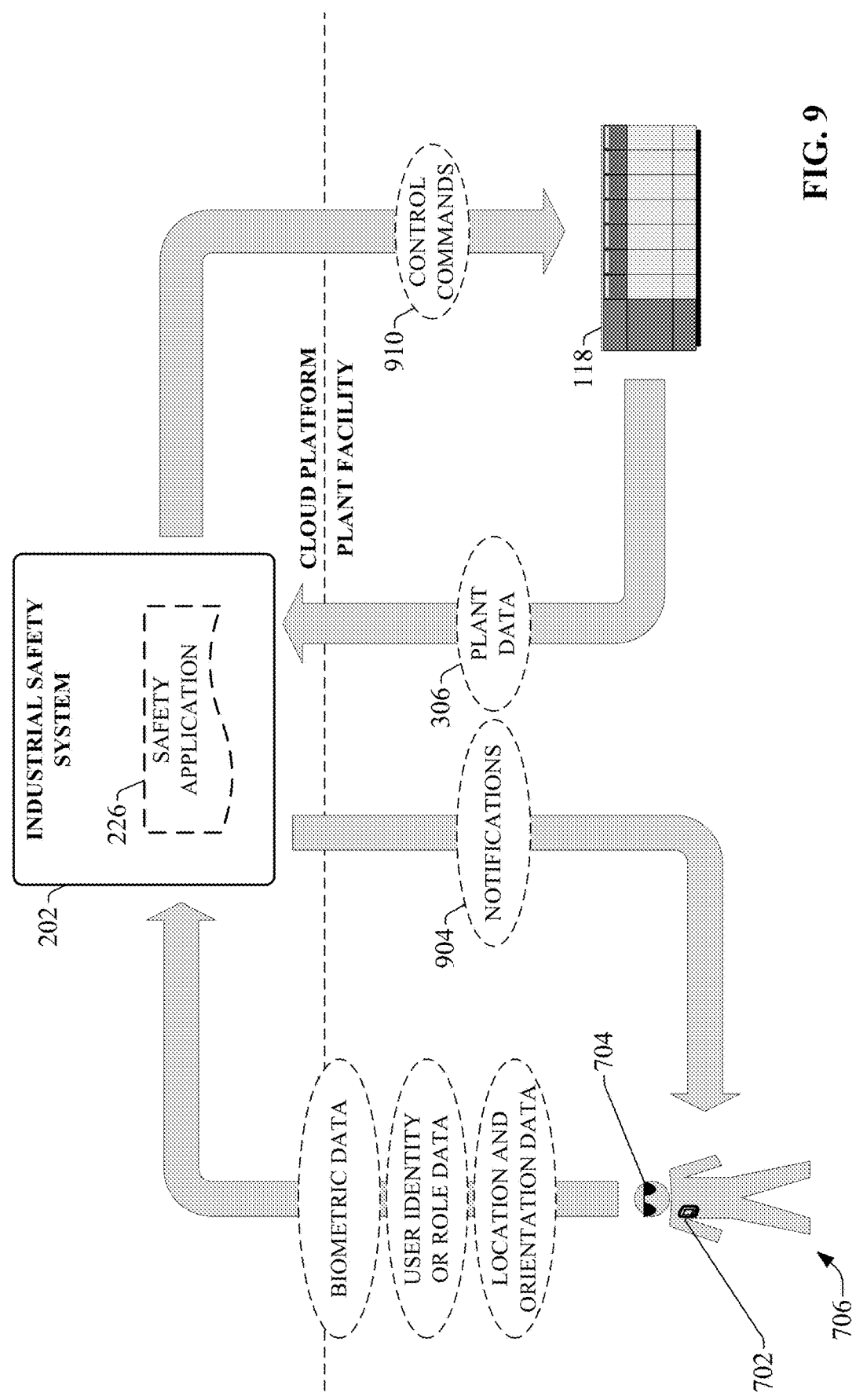
FIG. 9 is a diagram illustrating example data flows between plant floor devices and a cloud-level industrial safety system in connection with executing an industrial safety application.

FIG. 9 is a diagram illustrating example data flows between plant floor devices and the cloud-level industrial safety system 202 in connection with executing an industrial safety application 224. As noted above, safety system 202 collects plant data 306 from industrial devices across the plant environment, including but not limited to industrial controllers 118 (as shown in FIG. 9), safety relays, safety input devices, vision systems, industrial robots, motor drives, or other such devices and systems. If required by the safety application 226 being executed, the safety system 202 can also collect user-specific information from personal devices (e.g., electronic badges 702 or AR wearable appliances 704) worn by personnel or visitors within the industrial facility. This user-specific information can include, but is not limited to, user identity data, role data specifying a role of the user (e.g., machine operator, maintenance personnel, manager, engineer, visitor, etc.), a current location of the user within the plant, a current orientation of the user (e.g., the user's direction of view), biometric information for the user (e.g., heart rate, blood pressure, fatigue, ergonomic information, etc.), or other such personal information.

The industrial safety system 202 processes the plant data 306 collected from the plant-floor devices and systems and, if required, the user-specific data in accordance with the safety application 226. If results of the processing indicate or predict an unsafe condition that requires a hazard mitigation action, the safety system 202 generates control commands 910 directed to one or more industrial devices associated with hazardous machinery (e.g., an industrial controller 118 as shown in FIG. 9, a contactor, an industrial robot, an AGV, or another industrial device) to place the machinery in a safe state. Safety system 202 may also generate notifications 904 directed to a personal device carried by a user or to another notification device (e.g., a stack light, a siren, an HMI, etc.) to notify users of a potentially hazardous scenario. Communications between the plant floor devices and the cloud-based safety system 202—including communication of the user-specific information, plant data 306, control commands 910, and notifications 904—can leverage SEP as described above to ensure safety reliable and error-free data communication.

Figure 10:
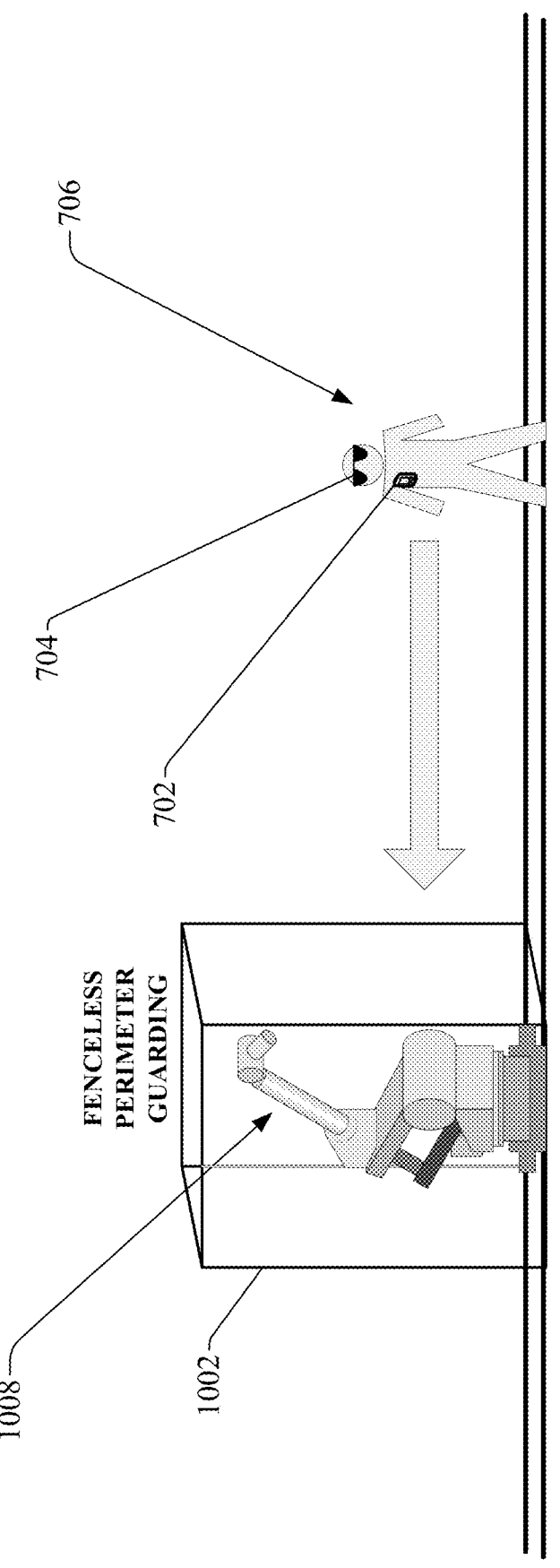
FIG. 10 is a diagram illustrating an example fenceless perimeter guarding safety application that can be controlled by embodiments of a cloud-based safety system.

Various example safety applications 224 that can make use of SEP to facilitate execution on a cloud-based industrial safety system 202 are now described. FIG. 10 is a diagram illustrating an example fenceless perimeter guarding application that can be controlled by embodiments of the safety system 202. In this example, the safety system 202 defines a virtual—or fenceless—perimeter guarding 1002 around a hazardous industrial machine 1008 or other dangerous equipment. The dimensions of the virtual perimeter guarding 1002 are designed to prevent personnel from entering the dangerous area while the machine 1008 is operating. Accordingly, the safety system 202 monitors the operating mode of the machine 1008 (as part of plant data 306) as well as the current locations of humans within the plant facility (as obtained from the personal devices 702 or 704) and places the machine 1008 in a safe state—e.g., a de-energized state, or a stopped or slow running mode—in response to determining that a person 706 has come within a minimum safe distance from the machine 1008 while the machine 1008 is in an unsafe state. The person 706 is determined to be within the minimum safe distance when human's current location data corresponds to a location that places the person 706 at or within the minimum safe distance from the machine 1008. Placing the machine 1008 in a safe state can involve, for example, sending a control command 910 to a safety contactor to disconnect power to the machine 1008, or sending a command 910 to the machine's industrial controller 118 to place the machine 1008 in a stopped or slow operating state.

In order to compare a human's current location with the location of the machine 1008 for the purposes of determining whether the person 706 has intersected with the virtual perimeter guarding 1002, some embodiments of the safety system 202 can maintain information specifying the locations of respective hazardous machines within the plant. In some embodiments, this machine location information can be maintained as part of a plant model or digital twin stored with the safety system 202. This plant model can identify the machines currently in operation within the plant facility as well as the locations of these machines for comparison with tracked human location data.

The minimum safe distance from the machine 1002 that will trigger the safety response corresponds to the boundaries of the virtual or fenceless perimeter guarding 1002. The fenceless perimeter guarding 1002 can be defined to have substantially any three-dimensional shape surrounding the machine 1002, thereby allowing different safe distances to be defined for different angles of approach to the machine 1008.

In some embodiments, the safety system 202 can also consider the person's biometric information when determining whether to initiate a hazard mitigation action. In this regard, certain biometric conditions, such as an elevated heart rate, blood pressure, or fatigue level, may increase the risk of a person entering or being affected by a hazard scenario. Accordingly, a user's personal device (e.g., badge 702 or wearable appliance 704) can collect and send this biometric data to the safety system 202, which can monitor this biometric data and initiate a hazard mitigation action upon determining that the user's biometric data—alone or in combination with other contextual factors—satisfy a defined criterion indicative of an elevated risk of hazard to the user. An example criterion may specify that the machine 1008 is to be placed in a safe state if it is determined that the user is within a defined distance from the machine 1008 and that any of the user's blood pressure, heart rate, or fatigue level exceeds a defined biometric safety threshold.

Some embodiments of the safety system 202 can also enforce preliminary safety conditions that must be satisfied before an industrial action is permitted to be initiated. For example, some industrial facilities may require that two or more operators are present at an industrial machine 1008 before the machine 1008 is permitted to run. This ensures that a second person is available to act as a safety partner in the case of injury. Accordingly, the safety system 202 can correlate current human locations—as determined from the current location data collected from respective user's personal devices (e.g., badge 702 or wearable appliance 704)—with the location of the machine 1008, and will only permit the machine 1008 to operate if two or more people are within a defined distance from the machine 1008 while also being outside the defined virtual perimeter guarding 1002. In some such embodiments, the safety system 202 may also consider the roles of the respective users when determining whether to permit the machine 1008 to operate. For example, the safety system 202 may only permit the machine 1008 to operate if two or more users who are designated as machine operators are within the defined distance from the machine 1008 while also being outside the virtual perimeter guarding 1002 (that is, if either of the two people present is not a machine operator, the safety system 202 will not permit the machine 1008 to run). The roles of the respective personnel can be provided to the system 202 by the personal devices 702, 704 carried by those persons in some embodiments. Alternatively, the roles associated with respective personnel can be registered with the safety system 202, and the safety system can determine the role of a given person by cross-referencing this registered role information with the user identity data received from the person's personal device 702, 704.

Although FIG. 10 depicts a stationary machine 1008 as being protected by virtual or fenceless perimeter guarding 1002, some embodiments of the safety system 202 can also define mobile perimeter guarding 1002 for moving hazardous machines such as AGVs. In such embodiments, the safety system 202 can track the dynamic location of the moving machine and continuously update the location and/ or orientation of the virtual perimeter guarding 1002 to track with the location and orientation of the machine. As in the case of stationary machines 1008, the safety system 202 can place the mobile machine in a safe state if the relative positions of the machine and a human are determined to place the human within a safe distance of the machine defined by the perimeter guarding 1002.

Figure 11:
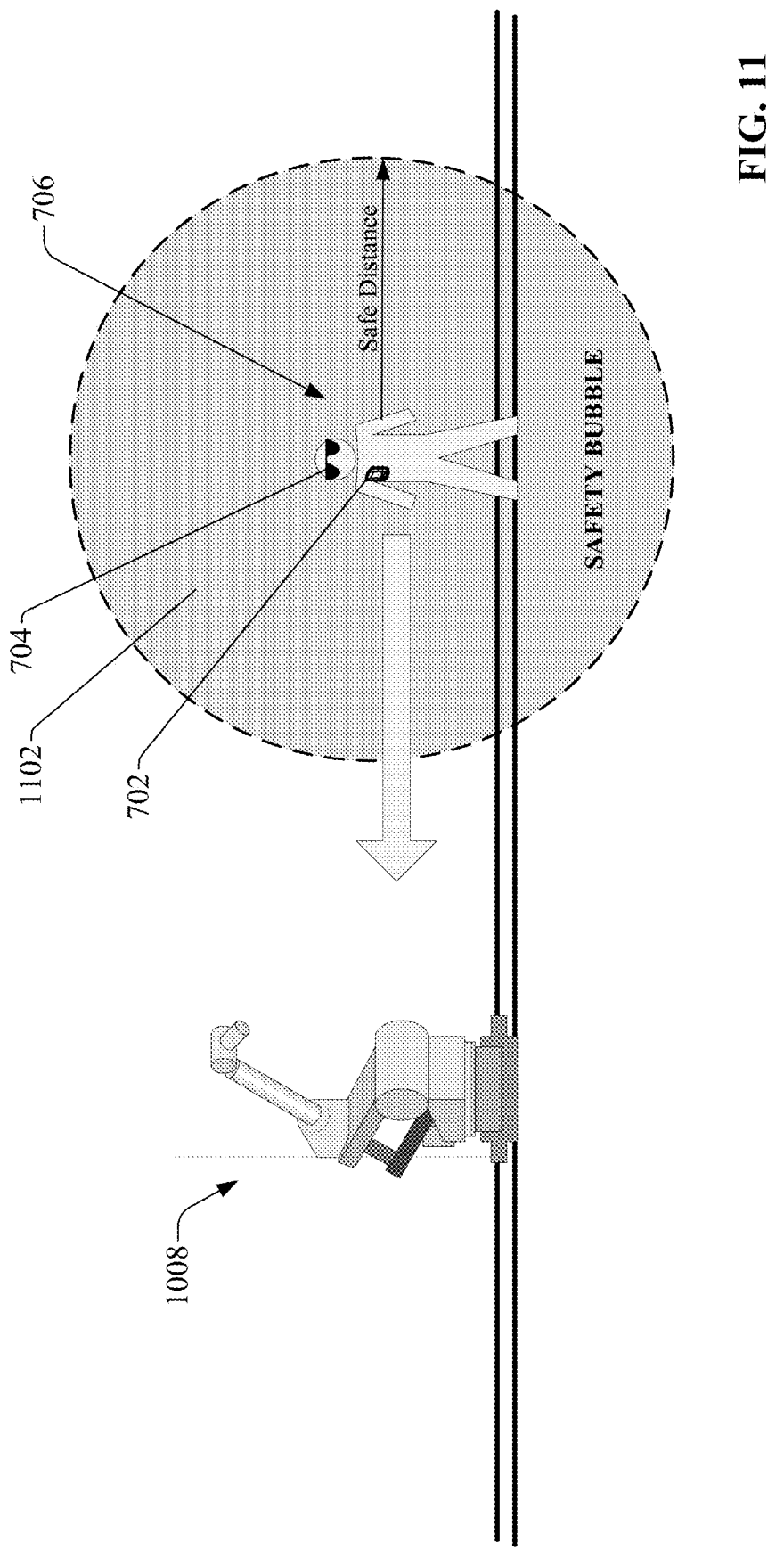
FIG. 11 is a diagram illustrating a person under the protection of a personal safety bubble maintained and monitored by a cloud-based industrial safety system.

In some embodiments, as an alternative to, or in addition to, virtual fenceless perimeter guarding 1002, the safety system 202 can maintain human safety bubbles for respective personnel within the plant facility. This concept is broadly similar to the fixed volumetric safety monitoring for a machine 1008, but provides dynamic personal safety monitoring for a person as that person moves around a plant facility. FIG. 11 is a diagram illustrating a person 706 under the protection of a personal safety bubble 1102 maintained and monitored by the safety system 202 in some embodiments. In general, the safety system 202 can coordinate plant data 309 and user-specific data (e.g., location and orientation, user identity or role, biometric data, etc.) collected from user-worn devices 702 or 704 to create and enforce virtual safety bubbles 1102 around those people. Each safety bubble 1102 is a virtual volume or space surrounding its associated person, where the volume corresponds to a minimum safe distance between the person 706 and potential hazards. The safety bubble 1102 tracks with the person's current location as the person moves through the plant. When a person's safety bubble 1102 overlaps with a potentially hazardous machine 1008—as determined based on a comparison between the current boundaries of the bubble 1102 (which is a function of the person's current location and the defined dimensions of the bubble 1102) and the known or tracked location of the machine 1008—the safety system 202 can initiate a safety action in the form of a control command 910 directed to the machine 1008 and/or the person 706. The action initiated by the safety system 202 can be a function of the nature of the hazard; the identity, role, or training of the protected person 706; the person's location within the plant; the type of machine 1008; or other such factors.

In some embodiments, the safety system 202 can dynamically change the size or dimensions of the safety bubble 1102 as a function of a current context. For example, a person's safety bubble 1102 may be relatively large as the person is traversing the plant (particularly in high-traffic areas) but may be reduced in size when the user enters a more constrained workstation in closer proximity to equipment. In another example, the size of the bubble 1102 may be a function of a current speed of the person 706, such that the size of the bubble 1102 is increased when the user is traveling at a speed that exceeds a defined threshold, thereby compensating for shorter reaction times.

In addition or as an alternative to dynamically changing the size, the safety function that is initiated by intrusion of a hazard into the safety bubble 1102 may be changed dynamically based on context. For example, the size or function of the bubble 1102 can be a function of a task currently being performed by the person 706, such that the size of the bubble 1102 is reduced or the safety function is relaxed if the person 706 is currently performing a maintenance function. In other examples, the bubble size or function can be a function of the area of the plant in which the person is currently located, a current operating mode or sequence step of a nearby machine 1008, a time of day or current work shift (e.g., such that the safety functions of the safety bubbles 1102 are relaxed during an overnight shift), the person's role or job function, or other such factors. The person 706 may also be permitted to request a change in the size or safety function of the bubble 1102 (e.g., via a wearable device), subject to permissible modifications given the current environmental context. Allowing the size and functions of the safety bubbles 1102 to be altered dynamically in accordance with a current context can minimize the impact of safety functions on productivity while still enforcing a prescribed level of risk mitigation.

The size or function of a person's personal safety bubble 1102 may also be a function of the person's level of training relative to a particular machine 1008 in proximity to the person 706. For example, a person 706 whose training records indicate a high level of hands-on experience with a given machine 1008 may be assigned a smaller safety bubble 1102 (or a bubble 1102 with relaxed safety functions) by the safety system 202 relative to an inexperienced person 706. Some embodiments of the safety system 202 can infer the person's level of experience with a given machine 1008 based on a tracked history of the user's interactions with the machine 1008, and set the size of the bubble 1102 or the safety function associated with the bubble 1102 based on this inferred experience level.

Safety functions or hazard mitigation actions that can be initiated in response to an overlap between the safety bubble 1102 and a potential hazard can include activating a warning indication (e.g., a personal indicator on a user's personal device 702 or 706, or a fixed indicator near the hazard), altering a current path of a machine or AGV to avoid the protected person 706, slowing or stopping a machine or AGV, or other such functions.

In some embodiments the safety bubble 1102 can support tiered or layered safety functions, such that the safety response escalates as the overlap moves deeper into the safety bubble 1102 (i.e., closer to the protected person 706). For example, an overlap with the outer layer of the safety bubble may cause the safety system 202 to send a warning to the person's personal device 702, 704 without altering the machine's operation. If the overlap moves closer to the person 706—that is, deeper into the bubble 1102—the safety system 202 may then alter the machine operation or remove power from the machine 1008 to reduce the risk posed to the person 706. Any number of tiered risk mitigation actions can be supported by the safety system 202. According to an example set of tiered responses, after the initial notification that the person 706 is approaching the machine—triggered when the machine 1008 overlaps with the outermost layer of the safety bubble 1102—the safety system 202 can then place the hazardous machine 1008 in slow operating mode if the person 706 moves sufficiently close to the machine 1008 to cause the machine 1008 to overlap with a second layer of the safety bubble 1102, where this second layer is closer to the person 706 than the outermost layer. If the person 706 continues to move closer to the machine 1008 such that the machine 1008 overlaps with a third layer that is closer to the person 706 than the second layer, the safety system 202 can then place the machine 1008 in a stopped state (e.g., by removing power from the machine 1008 or otherwise stopping the machine 100/8). In some embodiments, the risk mitigation actions taken by the safety system 202 in response to overlaps with the various tiers of the bubble 1102 can depend on the degree of the person's training relative to the machine 1008.

Figure 12:
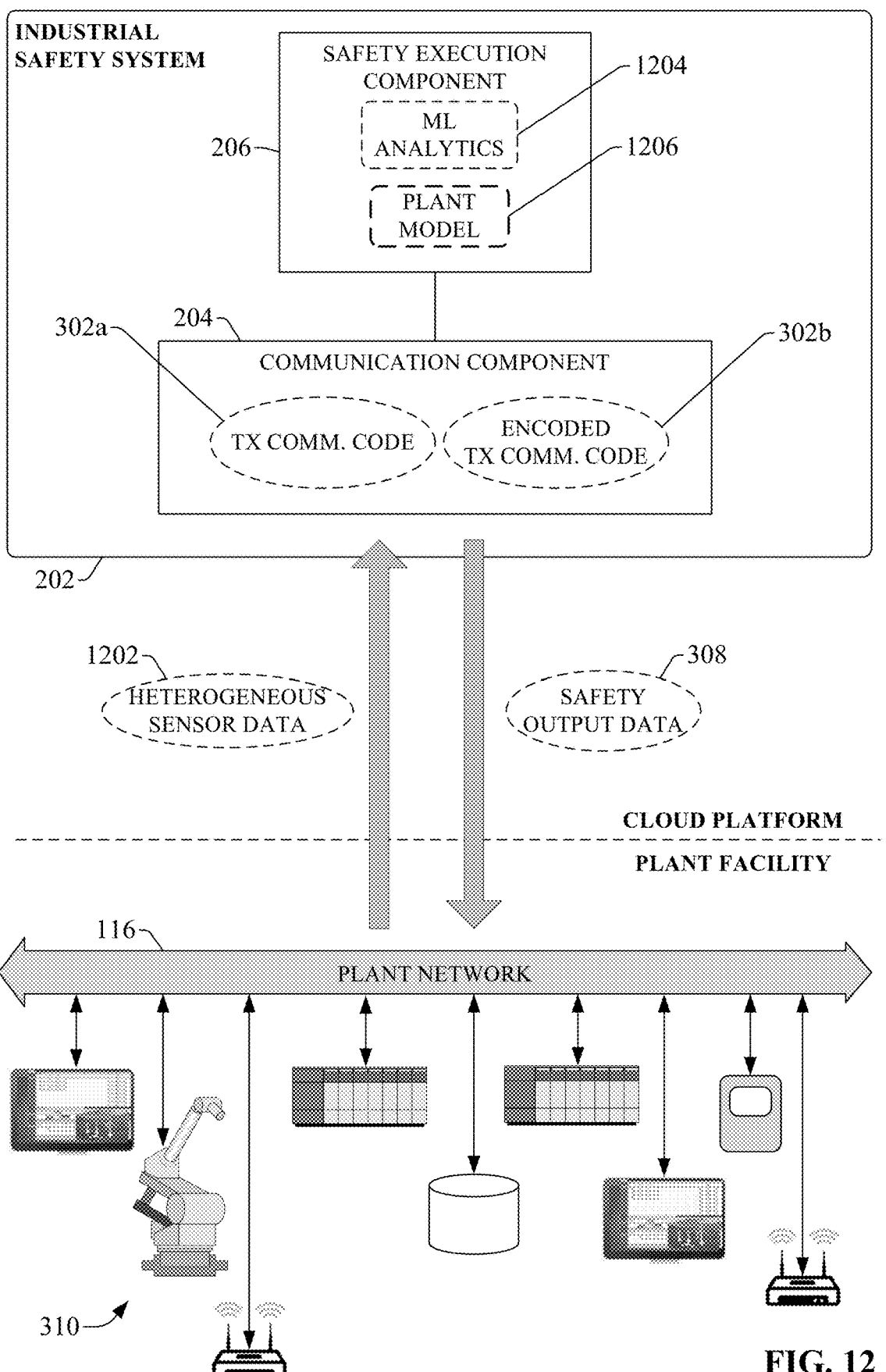
FIG. 12 is a diagram illustrating safety sensor fusion by a cloud-based industrial safety system.

Some embodiments of industrial safety system 202 can also support safety sensor fusion and plant modeling within the context of industrial safety. FIG. 12 is a diagram illustrating safety sensor fusion according to one or more embodiments. According to this approach, the safety system 202 melds heterogeneous data 1202 from multiple sources on the plant floor, including but not limited to vision systems, optical three-dimensional (3D) sensors or cameras such as time-of-flight sensors, industrial controllers, robot controllers, safety input devices, or other such sources. Based on this collected data 1202, the safety system 202 can generate a plant model 1206 or digital twin that describes the plant environment in terms of the current locations and behaviors of machines and humans within the plant. The safety system's safety execution component 206 can analyze this plant model 1206 to identify potentially hazardous scenarios that necessitate a hazard mitigation action—e.g., an impending collision between two AGVs, a person that has moved within a minimum safe distance from a machine, or other such scenarios—and, in response to detecting a hazardous scenario, will generate safety output data 308 directed one or more devices or systems on the plant floor to place the relevant machines in safe states. In some such embodiments, the safety execution component 1204 can apply machine learning analytics 1204 to the plant model 1206 in order to identify, infer, or predict hazardous scenarios within the plant facility, as well as to determine a suitable safety action to be initiated in order to mitigate the hazard.

The cloud-based industrial safety system 202 can support other types of industrial features in various embodiments. For example, in some embodiments the safety system 202 can act as a generic safety compute service on the cloud platform or on another server. Also, in some embodiments, rather than offloading a portion of the industrial safety processing to the cloud platform, entire industrial safety systems or components can be implemented on COTS hardware in the cloud, made feasible by the safety-reliable SEP-based application processing and data communication.

Similarly, entire industrial controllers 118 or safety relays can be virtually executed or emulated on the cloud-based safety infrastructure, such that I/O devices and safety input/output devices on the plant floor connect directly to the cloud and remotely interface with these cloud-based controllers and safety relays. In an example scenario, existing industrial controller infrastructures that do not currently have associated safety infrastructures can be integrated into the cloud-based safety system 202 as part of an aggregate cloud-based industrial control system with integrated safety processing. The safety system 202 can also execute safety-rated assurance algorithms for guard-banding AI behavior in some embodiments. Some embodiments of the industrial safety system 202 can also be configured to perform tool center point (TCP) calculations for industrial robots that are remotely interfaced with the system 202.

The use of SEP to verify error-free safety processing and data communication within the context of an industrial safety system as described herein can allow the non-safety-rated COTS hardware typically used as the underlying technology for cloud platforms to support a cloud-based industrial safety system without sacrificing SIL-rated processing and communication reliability, thereby permitting some or all of industrial safety processing to be offloaded to the cloud. This architecture can be used to support a wide range of industrial safety applications that may not otherwise be possible using purely localized industrial safety system within a plant facility.

FIGS. 13-15 illustrate various methodologies in accordance with one or more embodiments of the subject application. While, for purposes of simplicity of explanation, the methodologies shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 13 illustrates an example methodology 1300 for validating error-free industrial safety processing on a cloud-based industrial safety system using software encoded processing. This methodology 1300 can be used to achieve SIL3 or higher safety reliability for execution of industrial safety applications on non-safety rated cloud hardware. Initially, at 1302, safety input data is processed using industrial safety processing code that executes on a cloud-based industrial safety system to yield safety processing results. The safety input data can comprise, for example, industrial data collected by the safety system from industrial devices or systems at one or more plant facilities. The safety processing code of step 1302 executes on a system that supports software encoded processing but is itself non-encoded and thus yields non-encoded safety processing results. At 1304, an encoded version of the safety input data can be processed using an encoded version of the industrial safety processing code that executes on the cloud-based industrial safety system to yield encoded safety processing results. In an example application, the encoded versions of both the safety input data and the safety processing code can be encoded arithmetically, such that the safety inputs as well as the operands and operators of the safety processing code are scaled using a prime number. Other types of encoding can also be used to encode the safety input data and the safety processing code without departing from the scope of one or more embodiments.

At 1306, a determination is made as to whether a comparison of the safety processing results and the encoded safety processing results satisfies a validation criterion. According to an example approach, if the encoded safety processing code was arithmetically scaled using a scale factor, the values contained in the encoded safety processing results obtained in step 1304 can be scaled down the values by the same scale factor, and a determination can be made as to whether the resulting values are equal to their corresponding values in the primary results obtained in step 1302. According to another example approach, a first checksum can be calculated for the encoded processing results obtained in step 1304 and a second checksum can be calculated for the primary processing results obtained in step 1302 using the same checksum calculation method, and a determination can be made as to whether the first checksum of the encoded processing results is greater than the checksum of the primary processing results by a multiple equal to the scale factor used to encode the encoded safety processing code. Other types of SEP validation techniques are also within the scope of one or more embodiments.

If the comparison of the safety processing results and the encoded safety processing results satisfies the validation criterion (YES at step 1306), the methodology proceeds to step 1308, where the safety processing results are used in connection with an industrial safety application executed by the industrial safety system. Alternatively, if the validation criterion is not satisfied (NO at step 1306), the methodology proceeds to step 1310, where the safety processing results are rejected. In some embodiments, if the validation criterion is not satisfied, a default safety action can also be initiated to ensure that the faulty safety processing does not result in injury or damage on the plant floor. The default safety action can comprise, for example, placing a hazardous machine in a safe state, moving an industrial robot to a safe position, rerouting a AGV to a safe route, or other such actions.

FIG. 14 illustrates an example methodology 1400 for using SEP to encode safety outputs generated by a cloud-based industrial safety system. Initially, at 1402, industrial safety outputs generated by a cloud-based industrial safety system are processed using transmission communication code to yield safety data packets. The safety outputs may be, for example, instructions directed to an industrial device or system to place a hazardous machine in a safe state in response to detection of a hazardous condition.

At 1404, encoded versions of the industrial safety outputs are processed using an encoded version of the transmission communication code to yield encoded safety data packets. As with the safety processing code described in connection with FIG. 13, the encoded versions of the safety outputs and the communication code can be encoded arithmetically, or using any other suitable encoding technique.

At 1406, the safety data packets obtained in step 1402 and the encoded safety data packets obtained in step 1404 are sent to an industrial device or system residing in an industrial facility for validation and processing. In some embodiments, rather than sending the encoded safety data packets to the plant facility, a checksum or other type of characteristic of the encoded safety data packets can be calculated, and this checksum can be sent to the industrial device or system for verification purposes.

FIG. 15 illustrates an example methodology 1500 for using SEP to validate safety outputs received at an industrial device or system from a cloud-based industrial safety system. The received safety outputs can be sent by the safety system using methodology 1400 described above. Initially, at 1502, safety data packets and encoded safety data packets are received at an industrial device or system from a cloud-based industrial safety system. At 1504, a determination is made as to whether a comparison of the safety data packets and the encoded safety data packets satisfies a defined validation criterion. According to an example verification technique, if the encoded communication code that was used to generate the encoded safety data packets was arithmetically scaled using a scale factor, the values contained in the encoded safety data packets can be scaled down by the same scale factor and a determination can be made as to whether the resulting values are equal to their corresponding values in the primary packets. According to another example approach, rather than receiving both the non-encoded packets and the encoded packets, the industrial device can receive the non-encoded packets as well as a checksum for the encoded packets that was calculated by the cloud-based safety system. The industrial device can then calculate a checksum for the primary packets using the same checksum calculation method used to obtain the checksum for the encoded packets, and verify that the received checksum of the encoded packets is greater than the calculated checksum of the non-encoded packets by a multiple equal to the scale factor used to encode the encoded communication code. Other types of SEP validation techniques are also within the scope of one or more embodiments. For example, in some embodiments, other pieces of information—rather than checksums—can be calculated or deduced from the content of the encoded packets and used to validate error-free transmission.

If the comparison satisfies the validation criterion (YES at step 1504), the methodology proceeds to step 1506, where safety outputs are extracted from the safety data packets and processed by the industrial device. Alternatively, if the comparison does not satisfy the validation criterion (NO at step 1504), the methodology proceeds to step 1508, where the safety data packets are rejected by the industrial device. In some embodiments, if the validation criterion is not satisfied, which indicates an error in the data communication from the safety system to the industrial device, the industrial device can initiate a safety action that places associated machinery in a safe state to prevent injury or damage as a result of fault safety control data from the safety system.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as common industrial protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, OPC UA, and other such networks. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 16:
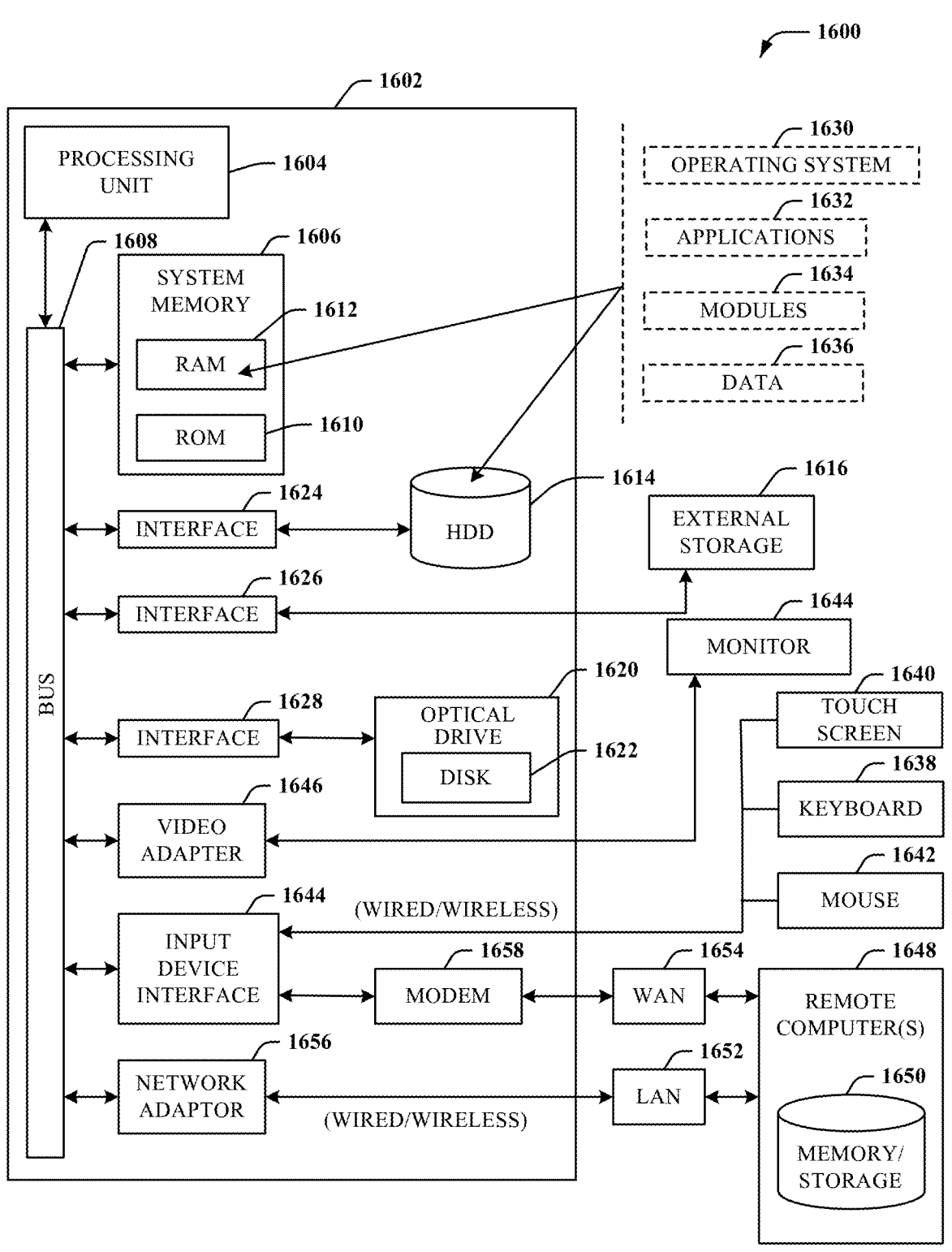
FIG. 16 is an example computing environment.
Figure 17:
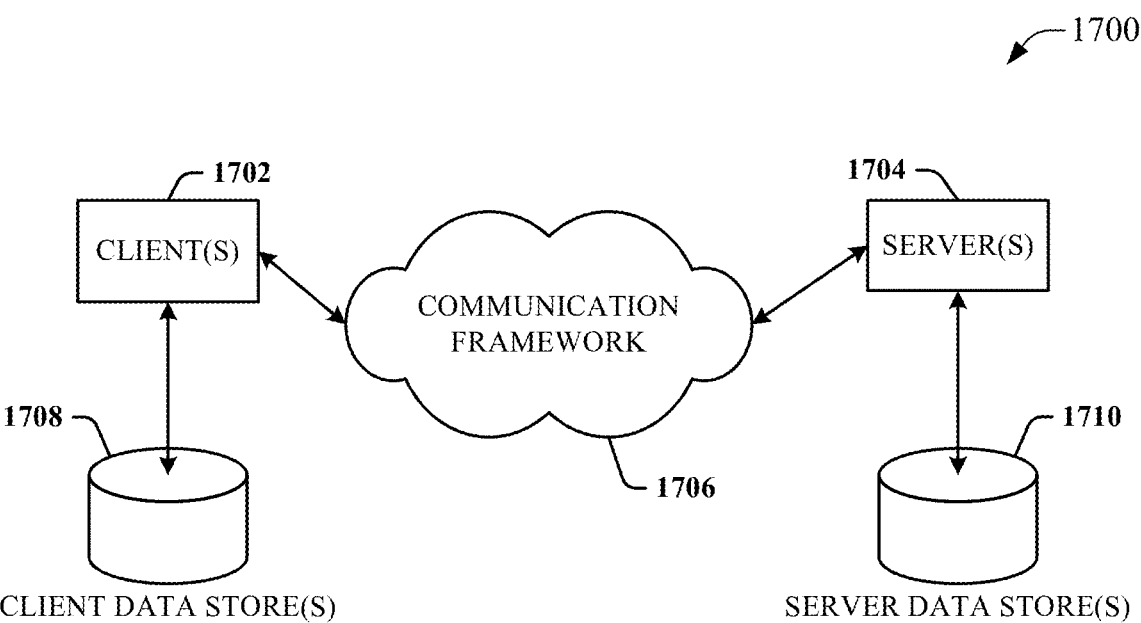
FIG. 17 is an example networking environment.

In order to provide a context for the various aspects of the disclosed subject matter, FIGS. 16 and 17 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16 the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), one or more external storage devices 1616 (e.g., a magnetic floppy disk drive (FDD) 1616, a memory stick or flash drive reader, a memory card reader, etc.) and an optical disk drive 1620 (e.g., which can read or write from a CD-ROM disc, a DVD, a BD, etc.). While the internal HDD 1614 is illustrated as located within the computer 1602, the internal HDD 1614 can also be configured for external use in a suitable chassis (not shown). Additionally, while not shown in environment 1600, a solid state drive (SSD) could be used in addition to, or in place of, an HDD 1614. The HDD 1614, external storage device(s) 1616 and optical disk drive 1620 can be connected to the system bus 1608 by an HDD interface 1624, an external storage interface 1626 and an optical drive interface 1628, respectively. The interface 1624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for application programs 1632. Runtime environments are consistent execution environments that allow application programs 1632 to run on any operating system that includes the runtime environment. Similarly, operating system 1630 can support containers, and application programs 1632 can be in the form of containers, which are lightweight, standalone, executable packages of software that include, e.g., code, runtime, system tools, system libraries and settings for an application.

Further, computer 1602 can be enabled with a security module, such as a trusted processing module (TPM). For instance with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1644 or other type of display device can be also connected to the system bus 1608 via an interface, such as a video adapter 1646. In addition to the monitor 1644, a computer typically includes other peripheral output devices (not shown), such as speakers, printers, etc.

The computer 1602 can operate in a networked environment using logical connections via wired and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1652 through a wired and/or wireless communication network interface or adapter 1656. The adapter 1656 can facilitate wired or wireless communication to the LAN 1652, which can also include a wireless access point (AP) disposed thereon for communicating with the adapter 1656 in a wireless mode.

When used in a WAN networking environment, the computer 1602 can include a modem 1658 or can be connected to a communications server on the WAN 1654 via other means for establishing communications over the WAN 1654, such as by way of the Internet. The modem 1658, which can be internal or external and a wired or wireless device, can be connected to the system bus 1608 via the input device interface 1642. In a networked environment, program modules depicted relative to the computer 1602 or portions thereof, can be stored in the remote memory/storage device 1650. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1652 or WAN 1654 e.g., by the adapter 1656 or modem 1658, respectively. Upon connecting the computer 1602 to an associated cloud storage system, the external storage interface 1626 can, with the aid of the adapter 1656 and/or modem 1658, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 17 is a schematic block diagram of a sample computing environment 1700 with which the disclosed subject matter can interact. The sample computing environment 1700 includes one or more client(s) 1702. The client(s) 1702 can be hardware and/or software (e.g., threads, processes, computing devices). The sample computing environment 1700 also includes one or more server(s) 1704. The server(s) 1704 can also be hardware and/or software (e.g., threads, processes, computing devices). The servers 1704 can house threads to perform transformations by employing one or more embodiments as described herein, for example. One possible communication between a client 1702 and servers 1704 can be in the form of a data packet adapted to be transmitted between two or more computer processes. The sample computing environment 1700 includes a communication framework 1706 that can be employed to facilitate communications between the client(s) 1702 and the server(s) 1704. The client(s) 1702 are operably connected to one or more client data store(s) 1708 that can be employed to store information local to the client(s) 1702. Similarly, the server(s) 1704 are operably connected to one or more server data store(s) 1710 that can be employed to store information local to the servers 1704.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:

a memory that stores executable components; and a processor, operatively coupled to the memory, that executes the executable components, the executable components comprising:

a communication component configured to collect, on a cloud platform, input data from first industrial devices that operate within an industrial facility; and a safety execution component configured to process the input data using a primary version of safety processing code associated with an industrial safety application to yield a safety processing result, process an encoded version of the input data using an arithmetically encoded version of the safety processing code to yield an encoded safety processing result, in response to validating that a result of a comparison between the safety processing result and the encoded safety processing result satisfies a criterion indicative of error-free execution of the safety processing code, generate safety output data directed to a second industrial device within the industrial facility based on the safety processing result, wherein the communication component is further configured to process the safety output data using transmission communication code to yield safety data packets, process an encoded version of the safety output data using an arithmetically encoded version of the transmission communication code to yield encoded safety data packets, and send the safety data packets and the encoded safety data packets to the second industrial device, and the safety data packets and the encoded safety data packets cause the second industrial device to initiate a safety action designed to mitigate a hazard indicated by the safety processing result.

2. The system of claim 1, wherein the criterion indicative of error-free execution of the safety processing code comprises a verification that a calculated property of the encoded safety processing result is greater than a corresponding calculated property of the safety processing result by a factor equal to a scale factor used to encode the arithmetically encoded version of the safety processing code.

3. The system of claim 1, wherein the communication component is configured to collect the input data via a communication protocol that utilizes software encoded processing.

4. The system of claim 1, wherein the communication component is configured to receive, from an industrial device of the first industrial devices, a first set of data packets containing input data generated by a primary version of communication code that executes on the industrial device, receive, from the industrial device, a second set of data packets containing an encoded version of the input data generated by an arithmetically encoded version of the communication code, and in response validating that a result of a comparison between the first set of data packets and the second set of data packets satisfies a criterion indicative of error-free execution of the communication code, permit the input data to be processed in connection with execution of the industrial safety application.

5. The system of claim 1, wherein the input data comprises at least one of safety input data generated by a safety input device, human location or biometric data generated by a wearable appliance, controller data generated by an industrial controller, motor drive data, data generated by a vision system, data generated by a three-dimensional optical sensor, or data generated by an autonomous guided vehicle.

6. The system of claim 1, wherein the input data comprises at least location information for a person within the industrial facility, and the safety execution component is configured to send, as the safety output data, an instruction to place an industrial machine in a safe state in response to determining that the location information corresponds to a location within a defined minimum safe distance from the industrial machine.

7. The system of claim 6, wherein the industrial safety application defines virtual perimeter guard around the industrial machine, and the minimum safe distance corresponds to boundaries of the virtual perimeter guarding.

8. The system of claim 1, wherein the input data comprises at least location information for a person within the industrial facility, the industrial safety application defines a three-dimensional virtual safety bubble around a person within the industrial facility, the virtual safety bubble defining a safe distance between the person and a hazard, and the safety execution component is configured to send, as the safety output data, an instruction to place an industrial machine in a safe state in response to determining that a location of the industrial machine overlaps with a boundary of the virtual safety bubble.

9. The system of claim 1, wherein the safety action is at least one of a placement of an industrial machine in a safe state, an opening of a safety contactor that disconnects power from an industrial machine, or a rerouting of a path of an industrial machine or autonomous vehicle.

10. The system of claim 1, wherein the safety execution component is further configured to, in response determining that the result of the comparison between the safety processing result and the encoded safety processing does not satisfy the criterion indicative of error-free execution of the safety processing code, generate an error notification and send a control instruction to the second industrial device that causes the second industrial device to perform a default safety action.

11. A method, comprising:

collecting, by an industrial safety system on a cloud platform comprising a processor, input data from first industrial devices that operate within a plant facility;

processing, by the industrial safety system, the input data on the cloud platform in accordance with an industrial safety application, wherein the processing comprises:

processing the input data using a primary version of the safety processing code to yield a safety processing result;

processing an encoded version of the input data using an arithmetically encoded version of the safety processing code to yield an encoded safety processing result; and in response to validating that a result of a comparison between the safety processing result and the encoded safety processing result satisfies a criterion indicative of error-free execution of the safety processing code, generating safety output data based on the safety processing; and sending, by the industrial safety system, the safety output data directed to a second industrial device within the plant facility, wherein the sending comprises:

processing the safety output data using transmission communication code to yield safety data packets;

processing an encoded version of the safety output data using an arithmetically encoded version of the transmission communication code to yield encoded safety data packets; and sending the safety data packets and the encoded safety data packets to the second industrial device, wherein the sending of the safety output data causes the second industrial device to perform a safety action designed to mitigate a hazard indicated by the safety processing result.

12. The method of claim 11, wherein the validating comprises verifying that a calculated property of the encoded safety processing result is greater than a corresponding calculated property of the safety processing result by a factor equal to a scale factor used to encode the encoded safety processing code.

13. The method of claim 11, wherein the collecting comprises collecting the input data via a communication protocol that utilizes software encoded processing.

14. The method of claim 13, wherein the collecting comprises:

receiving, from an industrial device of the first industrial devices, a first set of data packets containing input data generated by a primary version of communication code that executes on the industrial device, receiving, from the industrial device, a second set of data packets containing an encoded version of the input data generated by an arithmetically encoded version of the communication code, and in response validating that a result of a comparison between the first set of data packets and the second set of data packets satisfies a criterion indicative of error-free execution of the communication code, permitting the input data to be processed in connection with execution of the industrial safety application.

15. The method of claim 11, wherein the input data comprises at least location information for a person within the industrial facility, and the processing comprises generating, as the safety output data, an instruction to place an industrial machine in a safe state in response to determining that the location information corresponds to a location within a defined minimum safe distance from the industrial machine.

16. The method of claim 11, wherein the input data comprises at least location information for a person within the industrial facility, and the processing further comprises:

defining a three-dimensional virtual safety bubble around a person within the industrial facility, the virtual safety bubble defining a safe distance between the person and a hazard, and generating, as the safety output data, an instruction to place an industrial machine in a safe state in response to determining that a location of the industrial machine overlaps with a boundary of the virtual safety bubble.

17. The method of claim 11, wherein the safety action is at least one of a placement of an industrial machine in a safe state, an opening of a safety contactor that disconnects power from an industrial machine, or a rerouting of a path of an industrial machine or autonomous vehicle.

18. A non-transitory computer-readable medium having stored thereon instructions that, in response to execution, cause an industrial safety system comprising a processor to perform operations, the operations comprising:

receiving, on a cloud platform, input data from first industrial devices that operate within an industrial facility;

processing the input data on the cloud platform in accordance with an industrial safety application, wherein the processing comprises:

processing the input data using a primary version of the safety processing code to yield a safety processing result;

processing an encoded version of the input data using an arithmetically encoded version of the safety processing code to yield an encoded safety processing result; and in response to validating that a result of a comparison between the safety processing result and the encoded safety processing result satisfies a criterion indicative of error-free execution of the safety processing code, generating safety output data based on the safety processing; and sending the safety output data directed to a second industrial device within the industrial facility, wherein the sending of the safety output data causes the second industrial device to perform a safety action designed to mitigate a hazard indicated by the safety processing result, and wherein the sending comprises:

processing the safety output data using transmission communication code to yield safety data packets;

processing an encoded version of the safety output data using an arithmetically encoded version of the transmission communication code to yield encoded safety data packets; and sending the safety data packets and the encoded safety data packets to the second industrial device.

19. The non-transitory computer-readable medium of claim 18, wherein the validating comprises verifying that a calculated property of the encoded safety processing result is greater than a corresponding calculated property of the safety processing result by a factor equal to a scale factor used to encode the encoded safety processing code.

20. The non-transitory computer-readable medium of claim 18, wherein the receiving comprises receiving the input data via a communication protocol that utilizes software encoded processing.

\* \* \* \* \*